United States Patent [19]

Schwaller et al.

[11] Patent Number: 5,881,237
[45] Date of Patent: Mar. 9, 1999

[54] METHODS, SYSTEMS AND COMPUTER PROGRAM PRODUCTS FOR TEST SCENARIO BASED COMMUNICATIONS NETWORK PERFORMANCE TESTING

[75] Inventors: Peter James Schwaller; John Quillian Walker, II; Steven Thomas Joyce; Timothy Scott Huntley, all of Raleigh, N.C.

[73] Assignee: Ganymede Software, Inc., Research Triangle Park, N.C.

[21] Appl. No.: 711,195

[22] Filed: Sep. 10, 1996

[51] Int. Cl.[6] ................................................ G06F 17/00
[52] U.S. Cl. ................................................. 395/200.54
[58] Field of Search .................... 395/200.54, 182.02, 395/183.19, 200.76, 200.79; 364/578; 702/186, 187

[56] References Cited

U.S. PATENT DOCUMENTS

| | | | |
|---|---|---|---|
| 4,545,011 | 10/1985 | Lyon et al. | 395/183.19 |
| 5,049,873 | 9/1991 | Robins et al. . | |
| 5,107,450 | 4/1992 | Lawrenz | 395/200.54 |
| 5,257,393 | 10/1993 | Miller | 395/200.54 |
| 5,572,640 | 11/1996 | Schetler . | |
| 5,634,009 | 5/1997 | Iddon et al. . | |
| 5,706,436 | 1/1998 | Lewis et al. . | |
| 5,764,915 | 6/1998 | Heimsoth et al. . | |
| 5,809,286 | 9/1998 | McLain, Jr. et al. . | |

OTHER PUBLICATIONS

Butterfield; "System Performance Monitor/2 Reference"; International Business Machines Corporation, 1991.
Brochure, "The DA–30® family of internetwork analyzers", Wandel & Goltermann (1994).
Brochure, "DA–30C Benchmarking Capabilities", Wandel & Goltermann (1995).
Brochure, "Vital Signs VisionNet", BlueLine Software, Inc., including inserts LAN Agent, VTAM Agent, NCPL Agent (1995).
Brochure, "Vital Signs VisionNet" (1995).
Brochure, "SmartBits: Switch testing in its simplest form . . . ", Netcom Systems, Inc. (1995).
Brochure, "EcoNET™: Networked Applications Performance Management", Compuware Corporation (1995).
Brochure, "Hot off the Shelf: Application Management", Data Communications (Jan. 1996).
Brochure, "EcoNET: The View From the Top", Hurwitz Consulting Group, Inc. (1995).
Brochure, "10 Reasons Why You Need An Applications View Of your Network", Compuware Corporation (Jan. 9, 1996).
Brochure, "Network General Corporation: Products and Services", Network General Corporation (1995).

(List continued on next page.)

*Primary Examiner*—Ellis B. Ramirez
*Attorney, Agent, or Firm*—Myers Bigel Sibley & Sajovec

[57] ABSTRACT

Communications network performance is tested utilizing a test scenario simulating actual communications traffic on the network to be tested. A console node is provided on the network for establishing the test scenario and assigning the test scenario to endpoint nodes on the network to be tested. Each endpoint node is assigned an endpoint node specific test protocol. Execution of the test protocols by the endpoint nodes is initiated by the console node. Performance data such as throughput, transaction rate and response time may be monitored at selected ones of the endpoint nodes and reported to the console node either as it is generated or after completion of the test. The test scenario may be terminated when all endpoint node specific test protocols have completed execution or when any one endpoint completes execution of its test protocol. Multiple network protocols may be utilized within a single test scenario. Each endpoint node specific test protocol includes an associated script representing a type of applications traffic such as a credit check, or a database update. Endpoint nodes execute tests as applications level programs on existing endpoint nodes on the network to be tested allowing testing of networks using actual protocol stacks independent of the applications programs available on existing endpoint nodes.

41 Claims, 12 Drawing Sheets

OTHER PUBLICATIONS

Brochure, "ProView: Network Performance Management Systems", Network Telemetrics, Inc. (1995).

Brochure, "Managing the User Environment across Integrated SNA and IP Networks", Network Telemetrics, Inc. (1995).

Brochure, "Using Performance Baselines to Manage Network Service Levels", Williamson, W., Network Telemetrics, Inc. (1995).

Brochure, "Standards Based Distributed Diagnostics for Enterprise Networks", Frontier Software Development, Inc. (Sep. 1995).

Brochure, "Quality Works—The most complete client/server testing solution you can buy", Segue Software Products (1996).

Brochure, "LANQuest: Net/WRx", LANQuest (Sep. 12, 1995).

Brochure, "NETBENCH(R) 3.01 Frequently Asked Questions", Ziff–Davis Benchmark Operation (no date).

METHODS, SYSTEMS AND COMPUTER PROGRAM PRODUCTS FOR TEST SCENARIO BASED COMMUNICATIONS NETWORK PERFORMANCE TESTING

CROSS REFERENCE TO RELATED APPLICATIONS

This application is related to the following applications filed concurrently herewith: SYSTEMS, METHODS AND COMPUTER PROGRAM PRODUCTS FOR APPLICATIONS TRAFFIC BASED COMMUNICATIONS NETWORK PERFORMANCE TESTING, U.S. application Ser. No. 08/711,248 filed on Sep. 10, 1996; and, METHODS, SYSTEMS AND COMPUTER PROGRAM PRODUCTS FOR ENDPOINT PAIR BASED COMMUNICATIONS NETWORK PERFORMANCE TESTING, U.S. application Ser. No. 08/711,607 filed on Sep. 10, 1996 (now U.S. Pat. No. 5,838,919).

FIELD OF THE INVENTION

The present invention, generally, relates to network communications systems, methods and computer program products and, more particularly, to systems, methods and computer program products for performance testing of computer networks.

BACKGROUND OF THE INVENTION

Computer networks have grown increasingly complex with the use of distributed client/server applications, mixed platforms and multiple protocols all on a single physical backbone. The control of traffic on the networks is likewise moving from centralized information systems departments to distributed workgroups. The growing utilization of computer networks is not only causing a move to new, high-speed technologies but is at the same time making the operation of computer networks more critical to day-to-day business operations.

The growth in complexity and dependence on computer networks heightens the need for network management tools to design, build and maintain computer networks. The mix of protocols and vendors of installed hardware on many computer networks generally increases the difficulty of accomplishing network management. This problem may arise in planning or designing changes to a network, monitoring performance of a network, and testing the impact on performance of different hardware and software being installed on a network. A variety of approaches to network management tools have been considered including, frame generators, passive monitors, simulation tools, and applications testers. However, each of these categories of network management tools may have its own limitations affecting a users ability to manage increasingly complex and critical computer networks.

Frame generators are typically used for performance and stress testing of network equipment. Typically, they are network analyzers with the ability to send as well as receive data. An example of a frame generator is the DA-30 from Wandel & Goltermann. Another example is SmartBits by Netcom Systems. SmartBits generates packets with fixed- or variable-length gap and packet contents while receiving packets. SmartBits provides for multiple modular ports mounted in a chassis for testing and monitoring internetworking equipment. On the receive side, each card contains counters to monitor the number of packets transmitted, received, collisions, byte count, triggers and certain errors or to monitor the rate of each parameter. A Windows programming interface allows the individual cards to be programmed. Various industry standard bench tests are supported. A third example is LANQuest Net/WRx which enables creation of traffic streams between a sending and receiving node for routers, bridges, hubs, switches and servers acting as routers. Net/WRx provides testing for new and existing network products for interoperability and functional operation. Net/WRx is designed to test product designs for network products. Frame generators are typically specialized, single-purpose hardware which may be connected to a network to be tested during a test. This can result in high costs, particularly if it is desirable to test a plurality of points requiring multiple systems to be connected for the test. Frame generators are also generally limited in their ability to test network performance under actual application conditions as they typically do not operate on communication nodes of the network to be tested but are instead hardware testers installed to test the network. In addition, they typically operate at layer 2 of the networking model, the link layer. Therefore, typically no real protocol stacks running on the network are used for testing again removing the test from the actual conditions under which the network to be tested would be used.

An alternative type of network management tool is a passive monitor. Passive monitors are a combination of hardware and software that typically monitor network traffic at the link layer. They are passive in that they watch the network traffic that is flowing rather than actively creating traffic. Passive monitors may be categorized as network analyzers, like Network General's Sniffer, and remote monitors, such as NETscout from Frontier Software Development, Inc., EcoNET from Compuware Corporation, and Vital Signs from VisionNet. However, these tools may also include various limitations. Because they monitor at the link layer, to get a complete picture of performance a monitor is typically required at every network segment, generally causing increased expense and setup requirements. These devices also are limited in that they may only monitor existing traffic as its passes them and may not test by generating predetermined traffic flow patterns.

Another network management tool is a simulation tool. Simulation tools provide a mathematical model of a network. The model is generated based on information about network design, hardware, and traffic patterns. Once the model is created, it can be used to predict network performance under different scenarios. However, these tools are generally limited in their ability to accurately model the network and update the model as the network is changed. In addition, various network problems can arise from subtle differences in configuration, queuing, congestion control and frame sizes which are typically difficult to model. Furthermore, they typically only simulate network performance for when a network is working correctly rather than identifying problems.

A fourth category of network management tools is application testers. These types of systems vary greatly but generally act by driving installed applications on a network. The testers typically simulate a user reading screens and typing at a keyboard to create network traffic. Such programs are generally intended to aid application developers, not network managers. Typically, the application must be available and installed before these tools can be utilized by a network manager. An example of such a test tool is QA Partner from Seque Software, Inc.

Various other testers aimed at addressing particular aspects of network management are available. ProView- SNA utilizes active traffic generation to measure network performance characteristics by monitoring round trip response times to SNA hosts and to LAN file servers. Under control of a ProView Management Station, Remote Agents execute application layer transactions, compute round trip response time and forward the results to the Management Station for display and storage. NetBench is a Ziff-Davis benchmark program that measures the performance of servers in a file server environment. It provides a way to measure, analyze, and predict how a server handles network file I/O requests from client computers in a file server environment.

These network management tools are generally limited in their ability to support multiple protocols and to test networks under actual operating conditions. It is increasingly important to analyze the actual performance of the network to be tested without the constraints and limitations of these existing tools. Additionally, scalabilty of tests, distributed testing and a means to test all types of network devices would provide greater testing flexibility to network managers.

SUMMARY OF THE INVENTION

Accordingly, it is an object of the present invention to provide network performance testing systems, methods and computer program products which provide network managers the ability to test the performance of a network in a manner which is representative of actual operating conditions on the network to be tested.

It is a further object of the present invention to provide such network performance systems, methods and computer program products with flexibility in how network performance is measured.

These and other objects are provided by methods, systems and computer program products which define a test scenario including a plurality of endpoint nodes having endpoint node specific test protocols under the test scenario. A console node is provided on the network to be tested at which the test scenario may be defined based on user input. The console node also provides the individual endpoint test protocols to each endpoint node involved in the test scenario, initiates execution of the test scenario, including the endpoint node specific test protocols at each of the selected endpoint nodes, terminates the test scenario, monitors the performance of the network by receiving performance data from the endpoint nodes executing the test scenario and analyzes the data to generate performance measurements including throughput and transaction rate. Results may be displayed at the console node, saved as a computer file or printed out.

The console node based network performance testing of the present invention provides both flexibility and ready scalability for network performance testing. Traffic generation during the test scenario is generated by endpoint nodes on the network to be tested and the test scenario can provide for varying the number of endpoint nodes executing protocols under the scenario as well as varying which endpoint nodes are involved in the test scenario. Accordingly, physically displaced endpoint nodes can be selected to test devices, such as routers, which may only handle a portion of the communications traffic on a network to be tested. Furthermore, both file servers and user terminals may be designated endpoint nodes for a test scenario to allow user to file server and user to user communications performance to be tested. Regardless of the endpoint node combination selected for a given test scenario, the performance data may still be collected and analyzed at the console node to allow for consistent and convenient analysis and reporting of test results regardless of the mix and location of the physical devices actually generating network communications traffic for the test scenario.

The test scenario may represent actual operating conditions by operating across various network protocols, such as TCP/IP or APPC, with a plurality of endpoint nodes on the network to be tested, each executing an endpoint node specific test protocol under the test scenario to emulate communications traffic. Scripts are assigned to each endpoint test protocol to represent a type of traffic such as file transfers, database updates, credit checks, etc. The scripts may be varied to increase or decrease the size and frequency of transactions as well as changing the number of transactions measured per measurement period.

Individual ones of the endpoint nodes generate communications traffic to other existing endpoints on the network and measure performance of the network during execution of their respective test protocols. Different endpoint nodes can be operated with different network protocols and different scripts during execution of the overall test scenario on the network, thereby allowing a varied mix of communications traffic representative of actual network operating conditions. Furthermore, because all of the individual endpoint protocols are associated under the defined test scenario, the test conditions, while flexible enough to represent actual operating conditions, are repeatable thereby allowing testing of changes in network hardware or software under controlled conditions which nonetheless reflect actual operating conditions. Test scenarios may also be varied to stress test different components of the network environment.

Tests may run until each of the endpoint test protocols is completed or until any one endpoint specific test protocol is completed. Each endpoint specific test protocol may further specify an associated endpoint node to communicate with during execution of the assigned test protocol. Each endpoint test protocol may execute as an application level program driving protocol stacks on the existing hardware of the network to be tested, independent of the actual application programs which may reside on the existing endpoint nodes. Accordingly, specialized hardware is not required because tests may be executed as software objects on existing endpoint node computers on the network to be tested.

Network performance may be described based on performance characteristics such as throughput, transaction rate and response time for the test scenario. Performance measurements may be generated during execution of the test scenario by providing ongoing reporting of performance data from the endpoint nodes or performance data can be reported after terminating the test scenario to prevent communications traffic associated with reporting from affecting the test results. The flexibility in defining a test scenario and central reporting provide ready access to results and allow for a variety of performance measurements to be generated based upon test objectives of a network manager.

Accordingly, the present invention provides for testing performance of a communications network including a plurality of endpoint nodes under conditions reflecting the actual operating conditions of the network to be tested. A console node is first added to the network. A test scenario is defined to simulate communications traffic between selected endpoint nodes to be tested. The test scenario includes a plurality of endpoint nodes for the test scenario and endoint information for the endpoint nodes. The endpoint information includes an endpoint node specific test protocol for each of the endpoint nodes and may also include a network protocol for the associated communications thereby providing a mix of network protocols in a single test scenario. Endpoint information is communicated over the network from the console node to the selected endpoint nodes. Execution of the endpoint node specific test protocols is initited from the console node as well. Performance of the network is monitored while the endpoint node specific test protocols are executed to obtain performance data. The endpoint node specific test protocols may include a type of data to transmit, how many times to transmit the data, what portion of the test protocol to time during execution, and what acknowledgments to receive during execution of the test protocol.

In another aspect of the present invention, the network communication test protocols along with execution initiation may be established at the console node and communicated over the network to be tested from the console node to the endpoint nodes. The console node may further synchronize initiating of the network communication test protocols. The capabilities of endpoint nodes may first be detected by the console node before assigning a test protocol and active active protocol stacks may also be detected on endpoint nodes.

In a further embodiment of the present invention, execution of the test protocols may be terminated. The protocols may be terminated and the test concluded for analysis after all of the protocols are completed or after any one test protocol of the test scenario has completed execution.

In a further aspect of the present invention, performance may be monitored at selected ones of the endpoint nodes. The monitored performance data is then reported to the console node. The performance data may be reported as it is generated during execution of the test scenario or after the test scenario is terminated. Invalid performance data may be removed by the console node from reported performance data.

Accordingly the systems, methods and computer program products of the present invention provide a capability to test networks under actual operating conditions not provided by existing network performance testing tools. Test scenarios are designed to reflect expected operating conditions including the flexibility to provide distinct endpoint specific test protocols from a console node to different endpoint nodes which then execute their individual test protocols under the overall network test scenario. Unlike applications testers, test execution is independent of existing installed applications and provides a test protocol to each endpoint which the endpoint may then execute and monitor. Specialized hardware is not required unlike typical frame generators, and tests can be readily expanded without a corresponding increase in hardware cost. Unlike passive monitors, the present invention allows active traffic generation with flexibility to create traffic reflecting actual operating conditions but under repeatable conditions. The present invention thereby provides network managers with an improved tool for designing and managing complex computer networks handling a variety of network protocols, hardware and applications traffic.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as methods, data processing systems (apparatus) or computer program products. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including semiconductor devices, hard disks, CD-ROMs, optical storage devices, or magnetic storage devices.

It is also to be understood that the present invention may be provided by combinations of steps for performing the specified functions and program instruction means for performing the specified functions. It will also be understood that these function can be implemented by special purpose hardware-based computer systems which perform the specified functions or steps, or combinations of special purpose hardware and computer instructions.

System Overview

Figure 1:
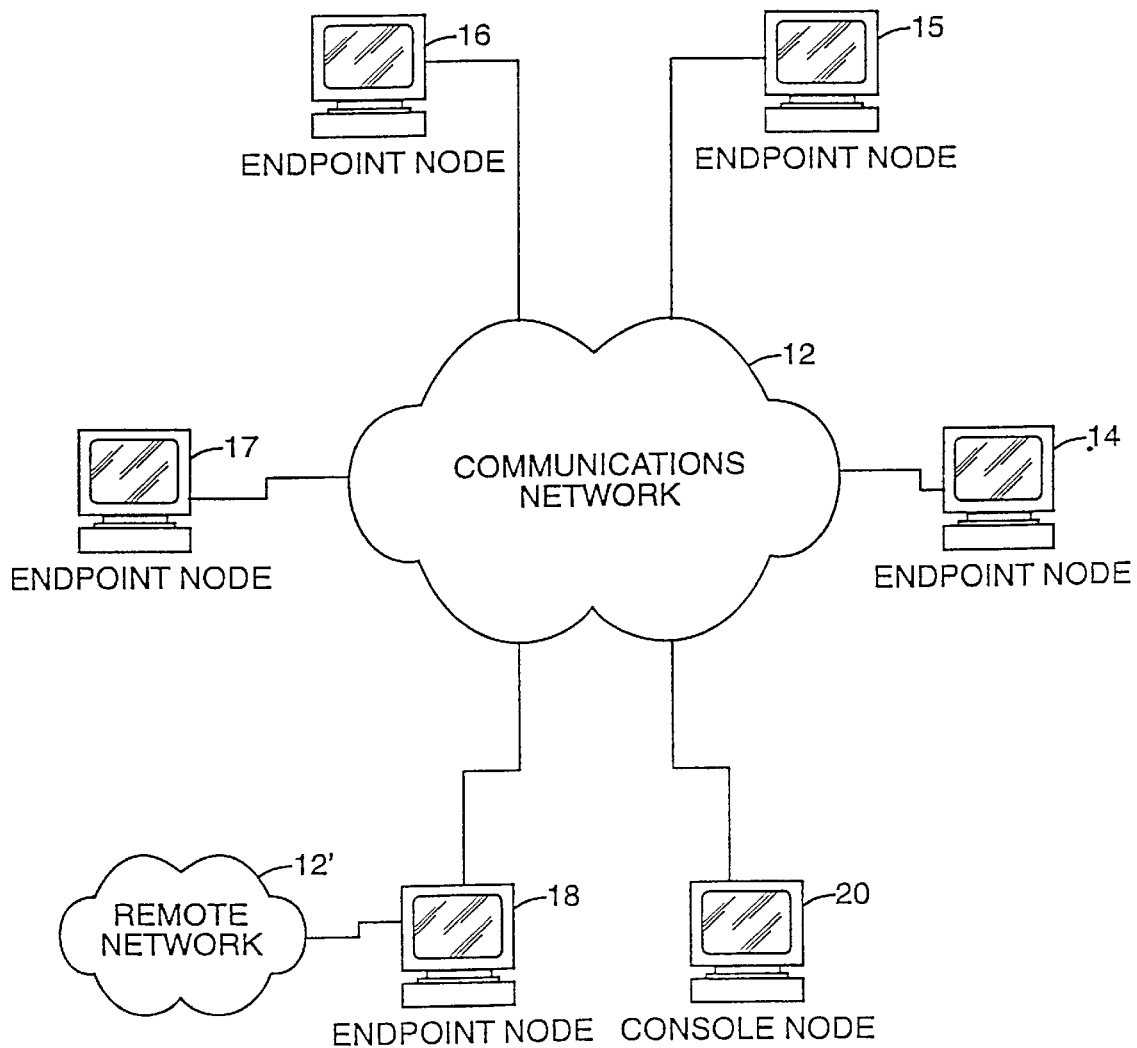
FIG. 1 schematically illustrates a hardware and software environment in which the present invention can operate.

Referring now to FIG. 1, a hardware and software environment in which the present invention can operate will now be described. As shown in FIG. 1, the present invention includes systems, methods and computer program products for testing the performance of a communications network 12. Communications network 12 provides a communication link between endpoint nodes 14, 15, 16, 17, 18 and console node 20.

As will be understood by those having skill in the art, a communications network 12 may be comprised of a plurality of separate linked physical communication networks which, using a protocol such as the Internet protocol, may appear to be a single seamless communications network to user application programs. For example, as illustrated in FIG. 1, remote network 12' and communications network 12 may both include a communication node at endpoint node 18. Accordingly, additional endpoint nodes (not shown) on remote network 12' may be made available for communications from endpoint nodes 14, 15, 16, 17. It is further to be understood that, while for illustration purposes in FIG. 1, communications network 12 is shown as a single network it may be comprised of a plurality of separate interconnected physical networks. As illustrated in FIG. 1, endpoint nodes 14, 15, 16, 17, 18 may reside on a computer. As illustrated by endpoint node 18, a single computer may comprise multiple endpoint nodes. Performance testing of the present invention as illustrated in FIG. 1 further includes a designated console node 20. The present invention tests the performance of communications network 12 by the controlled execution of application type communication traffic between the various endpoint nodes 14, 15, 16, 17, 18 on communications network 12.

Figure 2:
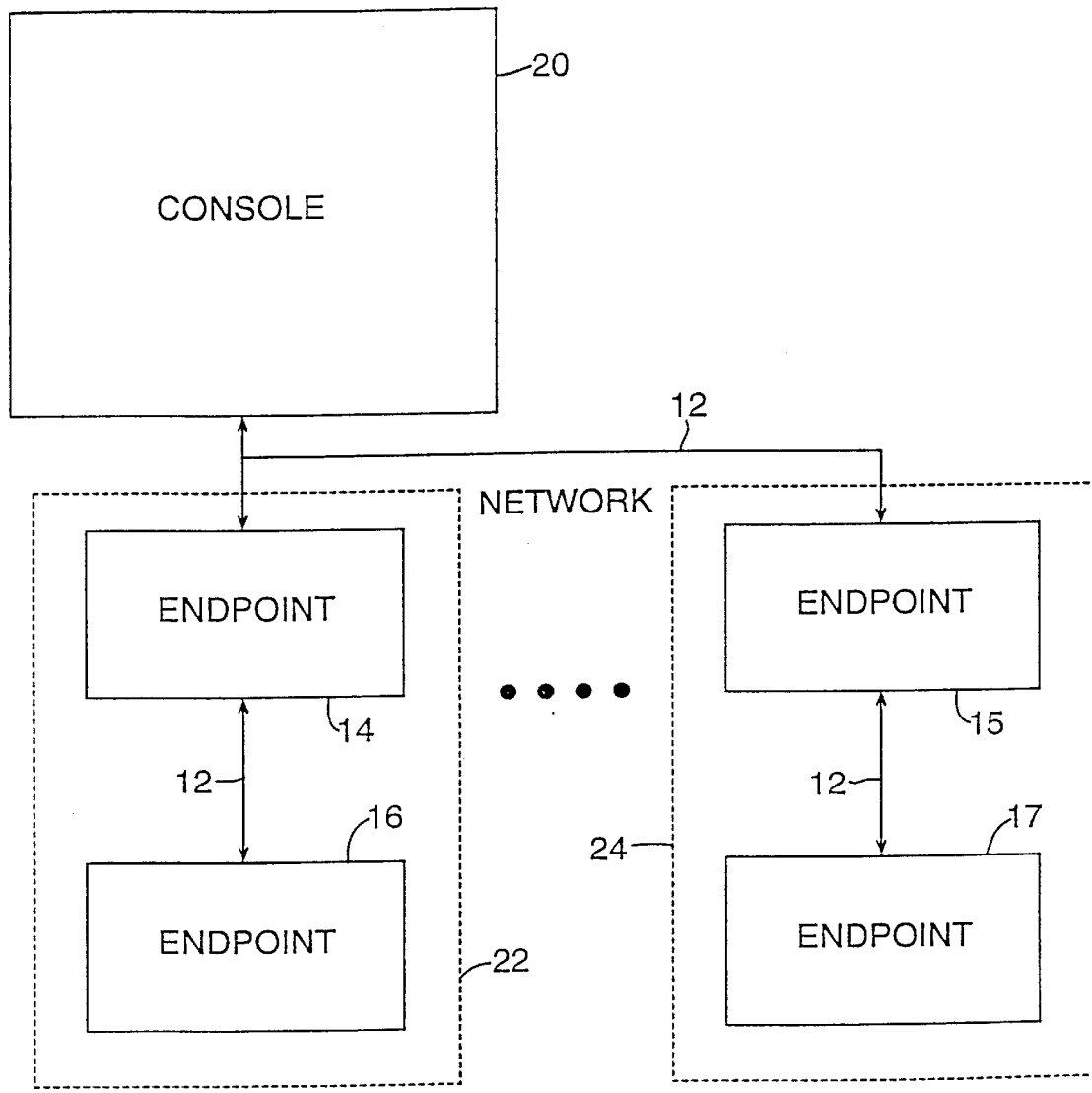
FIG. 2 is a block diagram of an embodiment of communications network performance testing according to the present invention.

As illustrated in the embodiment shown in the block diagram of FIG. 2, application communication traffic is simulated by communications between associated endpoint node pairs 22, 24. As illustrated in FIG. 2, endpoint node 14 and associated endpoint node 16 define a first endpoint node pair 22. Similarly, endpoint node 15 and associated endpoint node 17 define a second endpoint node pair 24. While it is preferred that application communication traffic be simulated by endpoint node pairs as illustrated in FIG. 2, it is to be understood that console node 20 may also perform as an endpoint node for purposes of a performance test. It is also to be understood that any endpoint node may be associated with a plurality of additional endpoint nodes to define a plurality of endpoint node pairs.

Console node 20, or other means for determining a type of application communications traffic expected on network 12 obtains user input, for example by keyed input to a computer terminal or through a passive monitor, to determine a type of application communications traffic on network 12. Console node 20, or other configuring means further defines a test scenario to simulate communications traffic between a plurality of selected endpoint nodes 14, 15, 16, 17, 18. Preferably, the test scenario is an endpoint pair based test scenario. Each endpoint node 14, 15, 16, 17, 18 is provided endpoint node information including an endpoint node specific network communication test protocol. Preferably, the network communication test protocols are based on a type of application communication traffic expected to provide a test scenario which simulates application communication traffic. Console node 20 or other determining means constructs the test scenario including the underlying test protocols and console node 20 or other initiating means initiates execution of test scenarios, preferably including synchronizing initiating test protocols, for testing network performance by execution of emulated distributed applications utilizing communications network 12. Test scenarios contain all of the information about a performance test including which endpoint nodes 14, 15, 16, 17, 18 to use and what test protocol and network protocol to use for communications between each endpoint pair 22, 24. The test protocol for an endpoint pair 22, 24 may include a test protocol script. A given test scenario may include network communications test protocols including a plurality of different test protocol scripts as illustrated in TABLE 1.

TABLE 1

TEST SCENARIO EXAMPLE

| PAIR NO. | ENDPOINT 1 | ENDPOINT 2 | NETWORK PROTOCOL | SCRIPT |
|---|---|---|---|---|
| 1 | TESTA | TETSTB | APPC | FILERCVS |
| 2 | TESTC | TETSTD | TCP | FILERCVS |
| 3 | TESTA | TETSTD | TCP | INQUIRYS |

In the example shown in TABLE 1, a scenario including three endpoint pairs is illustrated. The network address for the first and second computer of each pair is identified along with the network protocol to use between them and the type of application to emulate referred to as the "script." A test scenario can include just one endpoint pair 22, 24 or can be very complex, running hundreds of endpoint pairs 22, 24 using a mix of network protocols and application flows. In addition to a network protocol, such as APPC or TCP, each endpoint pair 22, 24 is assigned a test protocol or script representing a type of application communication traffic to be emulated. Using the performance testing apparatus and method of the present invention, endpoint pairs 22, 24 use scripts to create the same dataflows that expected applications would create on communications network 12 without the actual applications having to be installed on the various computers.

As is discussed more fully below, a variety of scripts may be provided in accordance with the present invention to emulate common end-user applications as well as performance benchmarks. Operation of communication network performance testing of the present invention are centered at console node 20. For example, test files containing defined scenarios and available scripts are stored at console node 20 and distributed to endpoint nodes 14, 15, 16, 17, 18 as necessary when a test is to be performed. An example of a listing of a test scenario is as follows:

---

Ganymede Performance Measurement, version 1.00
Scenario Listing

SCENARIO:
    Testing 3 APPC and 2 TCP/IP file transfers at the same time
SUMMARY:
    5 endpoint pairs
    Network Protocol    Script Name      Service Quality 1. APPC (CPI-C)     FILEXFER.SCR     #BATCH
    2. APPC (CPI-C)     FILEXFER.SCR     #BATCH
    3. APPC (CPI-C)     FILEXFER.SCR     #BATCH
    4. TCP/IP (TCP)     FILEXFER.SCR     n/a
    5. TCP/IP (TCP)     FILEXFER.SCR     n/a GENERAL SCENARIO INFORMATION:
    Run scripts to completion
    Report results in batch
    Default console connection: APPC, mode: #INTER
ENDPOINT PAIR 1:
              from: USIBMNR.NR50146A
                to: USIBMNR.LU46
    using protocol: APPC, mode: #BATCH
  console protocol: default
            script: FILEXFER.SCR, version 1.0
       description: File transfer. long conversation -continued Ganymede Performance Measurement, version 1.00
Scenario Listing

| Variable name | Value | Description |
|---|---|---|
| num_transfers | 100 | how many file transfers |
| file_size | 1000000 | how many bytes to send overall |
| send_buffer | 10000 | how many bytes to send each time |
| recv_buffer | 10000 | how many bytes to recv each time |
| sleep_time | 5 | how many milliseconds to pause |

ENDPOINT PAIR 2:
    from: USIBMNR.TESTLU23
    to: NETFIELD.ASC46AQW
    using protocol: APPC, mode: #BATCH
    console protocol: default
    script: FILEXFER.SCR, version 1.0
    description: File transfer, long conversation

| Variable name | Value | Description |
|---|---|---|
| num_transfers | 100 | how many file transfers |
| file_size | 1000000 | how many bytes to send overall |
| send_buffer | 10000 | how many bytes to send each time |
| recv_buffer | 10000 | how many bytes to recv each time |
| sleep_time | 5 | how many milliseconds to pause |

ENDPOINT PAIR 3:
    from: USIBMNR.TESTLU23
    to: NETFIELD.ADDBHTE
    using protocol: APPC, mode: #BATCH
    console protocol: default
    script: FILEXFER.SCR, version 1.0
    description: File transfer, long conversation

| Variable name | Value | Description |
|---|---|---|
| num_transfers | 100 | how many file transfers |
| file_size | 1000000 | how many bytes to send overall |
| send_buffer | 10000 | how many bytes to send each time |
| recv_buffer | 10000 | how many bytes to recv each time |
| sleep_time | 5 | how many milliseconds to pause |

ENDPOINT PAIR 4:
    from: ganymede.nctda.org
    to: ganymede.nctda.org
    using protocol: TCP/IP (TCP Sockets)
    console protocol: default
    script: FILEXFER.SCR, version 1.0
    description: File transfer, long conversation

| Variable name | Value | Description |
|---|---|---|
| num_transfers | 100 | how many file transfers |
| file_size | 1000000 | how many bytes to send overall |
| send_buffer | 10000 | how many bytes to send each time |
| recv_buffer | 10000 | how many bytes to recv each time |
| sleep_time | 5 | how many milliseconds to pause |

ENDPOINT PAIR 5:
    from: ganymede.nctda.org
    to: vnet.ibm.com
    using protocol: TCP/IP (TCP Sockets)
    console protocol: default
    script: FILEXFER.SCR, version 1.0
    description: File transfer, long conversation

| Variable name | Value | Description |
|---|---|---|
| num_transfers | 100 | how many file transfers |
| file_size | 1000000 | how many bytes to send overall |
| send_buffer | 10000 | how many bytes to send each time |
| recv_buffer | 10000 | how many bytes to recv each time |
| sleep_time | 5 | how many milliseconds to pause |

In one embodiment of the present invention as illustrated in FIG. 2, endpoint information including an endpoint node specific test protocol including a script is provided first to a single endpoint node 14, 15 in each endpoint pair 22, 24. Endpoint 1 nodes 14, 15 insure that they can communicate with their respective endpoint node partners 16, 17. Endpoint 1 nodes 14, 15 then determine a partner endpoint node test protocol from the endpoint node specific test protocol and communicate that to endpoint 2 nodes 16, 17. It is to be understood that the partner endpoint node test protocol may alternatively be determined and communicated to endpoint 2 nodes 16, 17 from console node 20.

In practicing the present invention, network performance test results are based upon timing measurements. Accordingly, as each endpoint node pair 22, 24 reaches predetermined checkpoints within a script, it creates timing records. The timing records are returned to console node 20 which uses them to analyze the performance of communications network 12 by calculating statistics about a test run. Console node 20 also provides means for both initiating and terminating a test.

Overview of Test Scripts

Test scripts consist of commands such as SEND and RECEIVE, as well as script variables such as the size of the buffer used on a SEND. The data sent and received inside a script is preferably stream-oriented, not record-oriented.

In the present invention, scripts are designed so as to be independent of the network protocol. While various models define "layers" between applications and programs in different manners, network protocol generally refers to the protocol for layers below application level programs and above hardware. For example, in TCP/IP, network protocol refers to the Transport and Internetwork layers of the architectural model which are provided by the TCP/IP network protocol. This means each script may be used with various network protocols such as APPC and TCP/IP. Various test scripts are provided according to the present invention that either emulate standard benchmarks or represent various commonly encountered applications. Scripts are provided in two variations, long and short connections. For a long connection script, a single connection is used for the entire test script no matter how many transactions are run. The time to start and stop the connection is not included in the timing results. For short connection test scripts, a new connection is started for each transaction.

Network protocols generally have overhead associated with connection start-up and takedown. Having two variations of each script allows tests to be designed varying how much of the start-up/takedown overhead is factored into the tests. This provides flexibility to emulate most application designs. The performance difference on communications network 12 between short and long connections can be dramatic. For purposes of designing a test protocol scenario, if the user is trying to simulate a particular application, the same connection type should be used as is used by the application to be emulated. If the objective of the test protocol scenario is to test the backbone of communications network 12 or the equipment that supports it, long connections are preferable. Using long connections, endpoint node 14, 15, 16, 17, 18 do not have to go through the overhead of starting and ending connections and are, therefore, able to create considerably more communications traffic. If the test objective is to test protocol stacks, a mix of long and short connections should be used.

Designing an appropriate test scenario may include various candidate test scenarios to properly test how communications network 12 will operate under normal expected applications traffic loads. Preferably, a test scenario runs long enough so that the relative precision of the test results is small enough. Typical performance tests run two to five minutes although if communications network 12 has fluctuating performance longer test durations may be preferred. The timing records should be long enough to avoid timer error. The timing records are preferably taken frequently enough to show fluctuations in performance during the test. In addition, the number of timing records should not make the test become too large. Large tests may use up considerable memory and disk space, and may make the console graphic user interface 28 more cumbersome.

The duration of a test scenario is generally determined by the number of endpoint pairs 22,24, the number of timing records to generate, the number of transactions per timing record, and the amount of data sent in each transaction. For the sake of simplicity, assume that the number of endpoint pairs and the amount of data are fixed. For example, one timing record for each transaction would capture performance fluctuations that occur from transaction to transaction. However, in a large test scenario running small transactions like the Credit Check script, hundreds of thousands of timing records could be generated which may require a tremendous amount of memory at console node 20 and could require a lot of disk space. On the other hand, if only one timing record is generated for an entire test scenario, the results may be relatively simple to work with, but they may not capture any variation in performance from transaction to transaction. The objective is to find a balance. As a guideline, if a small number of endpoint pairs is selected, the test should be set to generate up to 500 timing records per pair. If a large numbers of pairs is selected, 50 timing records should be set. Keeping the total number of timing records in a test under 10,000 is preferable.

TABLE 2 provides a listing of various types of scripts which can be used beneficially with the present invention. The listing of scripts in TABLE 2 is only for purposes of example and it is to be understood that additional scripts simulating applications traffic may also be beneficially used with the present invention. For example, a script could mimic communications traffic created by popular applications such as Lotus Notes or TCP/Telnet. Other benchmarks could also be simulated with a script. It is also to be understood that variations on the detailed flows of the scripts may be provided while maintaining the objective of the respective scripts to represent the associated type of applications traffic.

TABLE 2

EXAMPLE TEST SCRIPTS

| Script Name | File Name | Description |
| --- | --- | --- |
| Credit Check | CREDITL.SCR CREDITS.SCR | This is a quick transaction that simulates a series of credit approvals. A record is sent from Endpoint 1. Endpoint 2 receives the record and sends back a confirmation. The default record size is 100 bytes. |
| Database Update | DBASEL.SCR DBASES.SCR | This is the most complex of the standard benchmarks. This script simulates a program that requests a record from Endpoint 2, gets it, updates it and sends it back. Lastly, Endpoint 1 receives a confirmation that the update was completed. The default sizes for the request and the record are 100 bytes. (This script can be described as an Inquiry followed by a Credit Check.) |
| File Transfer (Receive) | FILERCVL.SCR FILERCVS.SCR | This transaction simulates requesting a file and getting it back. The request from Endpoint 1 defaults to 100 bytes. The default file size is 100,000 bytes. |
| File Transfer (Send) | FILESNDL.SCR FILESNDS.SCR | This transaction simulates sending a file from Endpoint 1 to Endpoint 2, and getting a confirmation back. The default file size is 100,000 bytes. |
| Inquiry | INQUIRYL.SCR INQUIRYS.SCR | This is a standard client/server transaction. Endpoint 1 sends a request to Endpoint 2, which sends a reply back. Both the request and reply default to 100 bytes. The script variables let you add delays, and change the send and receive buffer sizes. |
| Packet Transmit (Long Send) | PACKETL.SCR | This script sends individual packets, as quickly as possible, without waiting for any kind of response. This is not a good test for gathering performance information. Measurements can be inaccurate, because the script ends without waiting for the receiving side to catch up. This test uses the FLUSH script command. While it has no effect on TCP/IP, it causes APPC to send data immediately, rather than waiting to fill buffers. |

Within each script, a variety of commands are utilized in emulating applications traffic. There are two categories of script commands: communication commands (such as SEND and RECEIVE) and program control commands (such as LOOP). TABLE 3 lists examples of communication commands which can be beneficially used in scripts according to the present invention. Also listed in TABLE 3 is a mapping of these commands to APPC and sockets APIs.

TABLE 3

COMMUNICATIONS COMMANDS

| Command | APPC | TCP Sockets |
| --- | --- | --- |
| CONNECT_INITIATE | TP_STARTED ALLOCATE | socket() bind() connect() |
| CONNECT_ACCEPT | RECEIVE_ALLOCATE | socket() bind() listen() accept() |
| SEND (byte_count, buffer_size) | Using SEND_DATA, send the number of bytes in byte_count, in | Using write(), send the number of bytes in byte_count, in buffer_size |

TABLE 3-continued

COMMUNICATIONS COMMANDS

| Command | APPC | TCP Sockets |
|---|---|---|
| | buffer_size chunks. The last buffer sent may be smaller than buffer_size. The maximum allowable value is 32767. | chunks. The last buffer may be smaller than the buffer_size. The maximum allowable value is 32767. |
| RECEIVE (byte_count, buffer_size) | Issue RECEIVE_AND_WAIT calls in a loop, until the number of bytes specified in byte_count have been received, in buffer_size chunks. The last buffer received may be smaller than the buffer_size value. The maximum value is also 32767. | Issue read() calls in a loop, until the number of bytes specified in byte_count have been received, in buffer_size chunks. The last buffer received may be smaller than the buffer_size value. The maximum allowable value is 32767. |
| CONFIRM_REQUEST | CONFIRM | Receive special data record from partner. |
| CONFIRM_ACKNOWLEDGE | CONFIRMED | Send special data record to partner. |
| DISCONNECT | Issue DEALLOCATE on the sending side; do memory cleanup on the receiving side. | close() |
| FLUSH | FLUSH | none (TCP/IP automatically sends data without waiting to fill network buffers) |

Shown in TABLE 4 are program control commands which may be beneficially applied to scripts in practicing the present invention to control their operation.

TABLE 4

PROGRAM CONTROL COMMANDS

| Command | Description |
|---|---|
| LOOP(n) | Repeat this loop "n" times. "n" is an integer in the range 1 to 999,999,999. |
| END LOOP | This marks the end of a loop. |
| START_TIMER | Marks the beginning of a checkpoint, and resets the transaction count to 1. Because timing records are kept only at Endpoint 1, this command is only used in the Endpoint 1 portion of scripts. |
| END_TIMER | Marks the end of a checkpoint. Causes a timing record to be built, which includes the transaction count. Because timing records are kept only at Endpoint 1, this command is only used in the Endpoint 1 portion of scripts. |
| INCREMENT_TRANSACTIONS | This increments the number of transactions per timing record. If transactions are being counted, count another transaction. This value is reset to 1 each time a START_TIMER command is executed. Because timing records are kept only at Endpoint 1, this command is only used in the Enpoint 1 portion of scripts. |
| SLEEP(n) | Don't do anything for "n" milliseconds. "n" is an integer in the range 0 to 999,999,999. The default value is 0, which means not to wait. Sleep commands can be used to simulate application processing time or human delays between transactions. |

Listings of Test Scripts

This section describes the specifics of various test scripts which can be beneficially used with the present invention including their commands and their script variables. It lists examples of default values for each script variable. On a typical 10 Mbps Ethernet LAN, these example test scripts, with their default values, should take about 30 seconds to run. Because of this, for some of the test scripts, the default "transactions_per_record" values differ between the long- and short-connection versions. The example script details are as follows:

CREDITL Script

This is a version of a Credit Check transaction that uses a long connection. This is a quick transaction that simulates a series of credit approvals. A record is sent from Endpoint 1 node 14, 15. Endpoint 2 node 16, 17 receives the record and sends back a confirmation.

| Endpoint 1 | Endpoint 2 |
|---|---|
| CONNECT_INITIATE | CONNECT_ACCEPT |
| LOOP | LOOP |
|   number_of_timing_records=50 |   number_of_timing_records=50 |
| START_TIMER | |
| LOOP | LOOP |
|   transactions_per_record=50 |   transactions_per_record=50 |

-continued

| | |
|---|---|
| SEND | RECEIVE |
|    size_of_record_to_send=100 |    size_of_record_to_send=100 |
|    send_buffer_size=DEFAULT |    receive_buffer_size=DEFAULT |
| | SLEEP |
| |    delay_before_responding=0 |
| CONFIRM_REQUEST | CONFIRM_ACKNOWLEDGE |
| INCREMENT_TRANSACTION | |
| END_LOOP | END_LOOP |
| END_TIMER | |
| SLEEP | |
|    transaction_delay=0 | |
| END_LOOP | END_LOOP |
| DISCONNECT | DISCONNECT |

| Variable Name | Default | Description |
|---|---|---|
| number_of_timing_records | 50 | How many timing records to generate |
| transactions_per_record | 50 | Transactions per timing record |
| size_of_record_to_send | 100 | Amount of data to be sent |
| send_buffer_size | DEFAULT | How many bytes of data in each SEND |
| receive_buffer_size | DEFAULT | How many bytes of data in each RECEIVE |
| transaction_delay | 0 | Milliseconds to pause |
| delay_before_responding | 0 | Milliseconds to wait before responding |

CREDITS Script

This is a version of a Credit Check transaction that uses short connections. This is a quick transaction that simulates a series of credit approvals. A record is sent from Endpoint 1 node 14, 15. Endpoint 2 node 15, 16 receives the record and sends back a confirmation.

| Endpoint 1 | Endpoint 2 |
|---|---|
| LOOP | LOOP |
|    number_of_timing_records=50 |    number_of_timing_records=50 |
|    START_TIMER | |
|    LOOP |    LOOP |
|      transactions_per_record=25 |      transactions_per_record=25 |
|      CONNECT_INITIATE |      CONNECT_ACCEPT |
|      SEND |      RECEIVE |
|         size_of_record_to_send=100 |         size_of_record_to_send=100 |
|         send_buffer_size=DEFAULT |         receive_buffer_size=DEFAULT |
| |      SLEEP |
| |         delay_before_responding=0 |
|      CONFIRM_REQUEST |      CONFIRM_ACKNOWLEDGE |
|      DISCONNECT |      DISCONNECT |
|      INCREMENT_TRANSACTION | |
|    END_LOOP |    END_LOOP |
|    END_TIMER | |
|    SLEEP | |
|      transaction_delay=0 | |
| END_LOOP | END_LOOP |

| Variable Name | Default | Description |
|---|---|---|
| number_of_timing_records | 50 | How many timing records to generate |
| transactions_per_record | 25 | Transactions per timing record |
| size_of_record_to_send | 100 | How many bytes of data in each send |
| send_buffer_size | DEFAULT | How many bytes of data in each SEND |
| receive_buffer_size | DEFAULT | How many bytes of data in each RECEIVE |
| transaction_delay | 0 | Milliseconds to pause |
| delay_before_responding | 0 | Milliseconds to wait before responding |

DBASEL Script

This is a version of a Database Update transaction that uses a long connection. This is a complex standard benchmark. It simulates a program that requests a record from Endpoint 2 node 16, 17, gets it, updates it and sends it back. Lastly, Endpoint 1 node 14, 15 receives a confirmation that the update was completed. (This script can be described as an Inquiry followed by a Credit Check.)

| Endpoint 1 | Endpoint 2 |
|---|---|
| CONNECT_INITIATE | CONNECT_ACCEPT |
| LOOP | LOOP |
|   number_of_timing_records=50 |   number_of_timing_records=50 |
|   START_TIMER | |
|   LOOP |   LOOP |
|     transactions_per_record=25 |     transactions_per_record=25 |
|     SEND |     RECEIVE |
|       size_of_record_to_send=100 |       size_of_record_to_send=100 |
|       size_of_record_to_send=100 |       size_of_record_to_send=100 |
|     RECEIVE |     SEND |
|       reply_size=100 |       reply_size=100 |
|       reply_size=100 |       reply_size=100 |
|     SEND |     RECEIVE |
|       update_size=100 |       update_size=100 |
|       update_size=100 |       update_size=100 |
|     CONFIRM_REQUEST |     CONFIRM_ACKNOWLEDGE |
|     INCREMENT_TRANSACTION | |
|   END_LOOP |   END_LOOP |
|   END_TIMER | |
|   SLEEP | |
|     transaction_delay=0 | |
| END_LOOP | END_LOOP |
| DISCONNECT | DISCONNECT |

| Variable Name | Default | Description |
|---|---|---|
| number_of_timing_records | 50 | How many timing records to generate |
| transactions_per_record | 25 | Transactions per timing record |
| size_of_record_to_send | 100 | Amount of data to be sent |
| reply_size | 100 | How many bytes to send in the reply |
| update_size | 100 | How many bytes to send in the update |
| transaction_delay | 0 | Milliseconds to pause |

DBASES Script

This is a version of a Database Update transaction that uses short connections. This is a complex standard benchmark. It simulates a program that requests a record from Endpoint 2 node 16, 17, gets it, updates it and sends it back. Lastly, Endpoint 1 node 14, 15 receives a confirmation that the update was completed. (This script can be described as an Inquiry followed by a Credit Check.)

| Endpoint 1 | Endpoint 2 |
|---|---|
| LOOP | LOOP |
|   number_of_timing_records=50 |   number_of_timing_records=50 |
|   START_TIMER | |
|   LOOP |   LOOP |
|     transactions_per_record=10 |     transactions_per_record=10 |
|     CONNECT_INITIATE |     CONNECT_ACCEPT |
|     SEND |     RECEIVE |
|       size_of_record_to_send=100 |       size_of_record_to_send=100 |
|       size_of_record_to_send=100 |       size_of_record_to_send=100 |
|     RECEIVE |     SEND |
|       reply_size=100 |       reply_size=100 |
|       reply_size=100 |       reply_size=100 |
|     SEND |     RECEIVE |
|       update_size=100 |       update_size=100 |
|       update_size=100 |       update_size=100 |
|     CONFIRM_REQUEST |     CONFIRM_ACKNOWLEDGE |
|     DISCONNECT |     DISCONNECT |
|     INCREMENT_TRANSACTION | |
|   END_LOOP |   END_LOOP |
|   END_TIMER | |
|   SLEEP | |
|     transaction_delay=0 | |
| END_LOOP | END_LOOP |

| Variable Name | Default | Description |
|---|---|---|
| number_of_timing_records | 50 | How many timing records to generate |
| transactions_per_record | 10 | Transactions per timing record |
| size_of_record_to_send | 100 | Amount of data to be sent |
| reply_size | 100 | How many bytes to send in the reply |
| update_size | 100 | How many bytes to send in the update |
| transaction_delay | 0 | Milliseconds to pause |

FILERCVL Script

This is a version of a File Receive transaction that uses a long connection. This transaction simulates requesting a file and getting it back.

| Endpoint 1 | Endpoint 2 |
|---|---|
| CONNECT_INITIATE | CONNECT_ACCEPT |
| LOOP | LOOP |
|   number_of_timing_records=100 |   number_of_timing_records=100 |
|   START_TIMER | |
|   LOOP |   LOOP |
|     transactions_per_record=1 |     transactions_per_record=1 |
|     SEND |     RECEIVE |
|       size_of_record_to_send=100 |       size_of_record_to_send=100 |
|       size_of_record_to_send=100 |       size_of_record_to_send=100 |
|     RECEIVE |     SEND |
|       file_size=100000 |       file_size=100000 |
|       receive_buffer_size=DEFAULT |       send_buffer_size=DEFAULT |
|     INCREMENT_TRANSACTION | |
|   END_LOOP |   END_LOOP |
|   END_TIMER | |
|   SLEEP | |
|     transaction_delay=0 | |
| END_LOOP | END_LOOP |
| DISCONNECT | DISCONNECT |

| Variable Name | Default | Description |
|---|---|---|
| number_of_timing_records | 100 | How many timing records to generate |
| transactions_per_record | 1 | Transactions per timing record |
| size_of_record_to_send | 100 | Amount of data to be sent |
| file_size | 100,000 | How many bytes are in the file |
| send_buffer_size | DEFAULT | How many bytes of data in each SEND |
| receive_buffer_size | DEFAULT | How many bytes of data in each RECEIVE |
| transaction_delay | 0 | Milliseconds to pause |

FILERCVS Script

This is a version of a File Receive transaction that uses short connections. This transaction simulates requesting a file and getting it back.

| Endpoint 1 | Endpoint 2 |
|---|---|
| LOOP | LOOP |
|   number_of_timing_records=100 |   number_of_timing_records=100 |
|   START_TIMER | |
|   LOOP |   LOOP |
|     transactions_per_record=1 |     transactions_per_record=1 |
|     SEND |     RECEIVE |
|       size_of_record_to_send=100 |       size_of_record_to_send=100 |
|       size_of_record_to_send=100 |       size_of_record_to_send=100 |
|     RECEIVE |     SEND |
|       file_size=100000 |       file_size=100000 |
|       receive_buffer_size=DEFAULT |       send_buffer_size=DEFAULT |
|     DISCONNECT |     DISCONNECT |
|     INCREMENT_TRANSACTION | |
|   END_LOOP |   END_LOOP |
|   END_TIMER | |
|   SLEEP | |
|     transaction_delay=0 | |
| END_LOOP | END_LOOP |

| Variable Name | Default | Description |
|---|---|---|
| number_of_timing_records | 100 | How many timing records to generate |
| transactions_per_record | 1 | Transactions per timing record |
| size_of_record_to_send | 100 | Amount of data to be sent |
| file_size | 100,000 | How many bytes are in the file |
| send_buffer_size | DEFAULT | How many bytes of data in each SEND |
| receive_buffer_size | DEFAULT | How many bytes of data in each RECEIVE |
| transaction_delay | 0 | Milliseconds to pause |

FILESNDL Script

This is a version of a File Send transaction that uses a long connection. This transaction simulates sending a file from Endpoint 1 node 14, 15 to Endpoint 2 node 16, 17, and getting a confirmation back.

| Endpoint 1 | Endpoint 2 |
|---|---|
| CONNECT_INITIATE | CONNECT_ACCEPT |
| LOOP | LOOP |
|   number_of_timing_records=100 |   number_of_timing_records=100 |
|   START_TIMER | |
|   LOOP |   LOOP |
|     transactions_per_record=1 |     transactions_per_record=1 |
|     SEND |     RECEIVE |
|       file_size=100000 |       file_size=100000 |
|       send_buffer_size=DEFAULT |       receive_buffer_size=DEFAULT |
|     CONFIRM_REQUEST |     CONFIRM_ACKNOWLEDGE |
|     INCREMENT_TRANSACTION | |
|   END_LOOP |   END_LOOP |
|   END_TIMER | |
|   SLEEP | |
|     transaction_delay=0 | |
| END_LOOP | END_LOOP |
| DISCONNECT | DISCONNECT |

| Variable Name | Default | Description |
|---|---|---|
| number_of_timing_records | 100 | How many timing records to generate |
| transactions_per_record | 1 | Transactions per timing record |
| file_size | 100,000 | How many bytes are in the file |
| send_buffer_size | DEFAULT | How many bytes of data in each SEND |
| receive_buffer_size | DEFAULT | How many bytes of data in each RECEIVE |
| transaction_delay | 0 | Milliseconds to pause |

FILESNDS Script

This is a version of a File Send transaction that uses short connections. This transaction simulates sending a file from Endpoint 1 node 14, 15 to Endpoint 2 node 16, 17, and getting a confirmation back.

| Endpoint 1 | Endpoint 2 |
|---|---|
| LOOP | LOOP |
|   number_of_timing_records=100 |   number_of_timing_records=100 |
|   START_TIMER | |
|   LOOP |   LOOP |
|     transactions_per_record=1 |     transactions_per_record=1 |
|     CONNECT_INITIATE |     CONNECT_ACCEPT |
|     SEND |     RECEIVE |
|       file_size=100000 |       file_size=100000 |
|       send_buffer_size=DEFAULT |       receive_buffer_size=DEFAULT |
|     CONFIRM_REQUEST |     CONFIRM_ACKNOWLEDGE |
|     DISCONNECT |     DISCONNECT |
|     INCREMENT_TRANSACTION | |
|   END_LOOP |   END_LOOP |
|   END_TIMER | |
|   SLEEP | |
|     transaction_delay=0 | |
| END_LOOP | END_LOOP |

| Variable Name | Default | Description |
|---|---|---|
| number_of_timing_records | 100 | How many timing records to generate |
| transactions_per_record | 1 | Transactions per timing record |
| file_size | 100,000 | How many bytes are in the file |
| send_buffer_size | DEFAULT | How many bytes of data in each SEND |
| receive_buffer_size | DEFAULT | How many bytes of data in each RECEIVE |
| transaction_delay | 0 | Milliseconds to pause |

INQUIRYL Script

This is a version of an Inquiry transaction that uses a long connection. This is a standard client/server transaction. Endpoint 1 node 14, 15 sends a request to Endpoint 2 node 16, 17, which sends a reply back. The script variables let you add delays, and change the send and receive buffer sizes.

| Endpoint 1 | Endpoint 2 |
|---|---|
| CONNECT_INITIATE | CONNECT_ACCEPT |
| LOOP | LOOP |
|   number_of_timing_records=50 |   number_of_timing_records=50 |
|   START_TIMER | |
|   LOOP |   LOOP |
|     transactions_per_record=50 |     transactions_per_record=50 |
|     SEND |     RECEIVE |
|       size_of_record_to_send=100 |       size_of_record_to_send=100 |
|       inquiry_send_buffer_DEFAULT |       inquiry_receive_buffer=DEFAULT |
| |     SLEEP |
| |       delay_before_responding=0 |
|     RECEIVE |     SEND |
|       reply_size=100 |       reply_size=100 |
|       reply_receive_buffer=DEFAULT |       reply_send_buffer=DEFAULT |
|     INCREMENT_TRANSACTION | |
|   END_LOOP |   END_LOOP |
|   END_TIMER | |
|   SLEEP | |
|     transaction_delay=0 | |
| END_LOOP | END_LOOP |
| DISCONNECT | DISCONNECT |

| Variable Name | Default | Description |
|---|---|---|
| number_of_timing_records | 50 | How many timing records to generate |
| transactions_per_record | 50 | Transactions per timing record |
| size_of_record_to_send | 100 | Amount of data to be sent |
| inquiry_send_buffer | DEFAULT | How many bytes of data in each SEND |
| inquiry_receive_buffer | DEFAULT | How many bytes of data in each RECEIVE |
| delay_before_responding | 0 | Milliseconds to wait before responding |
| reply_size | 100 | Amount of data to be sent |
| reply_send_buffer | DEFAULT | How many bytes of data in each SEND |
| reply_receive_buffer | DEFAULT | How many bytes of data in each RECEIVE |
| transaction_delay | 0 | Milliseconds to pause |

INQUIRYS Script

This is a version of an Inquiry transaction that uses short connections. This is a standard client/server transaction.

Endpoint 1 node 14, 15 sends a request to Endpoint 2 node 16, 17, which sends a reply back. The script variables let you add delays, and change the send and receive buffer sizes.

| Endpoint 1 | Endpoint 2 |
|---|---|
| LOOP | LOOP |
|   number_of_timing_records=50 |   number_of_timing_records=50 |
|   START_TIMER | |
|   LOOP |   LOOP |
|     transactions_per_record=25 |     transactions_per_record=25 |
|     CONNECT_INITIATE |     CONNECT_ACCEPT |
|     SEND |     RECEIVE |
|       size_of_record_to_send=100 |       size_of_record_to_send=100 |
|       inquiry_send_buffer=DEFAULT |       inquiry_receive_buffer=DEFAULT |
| |     SLEEP |
| |       delay_before_responding=0 |
|     RECEIVE |     SEND |
|       reply_size=100 |       reply_size=100 |
|       reply_receive_buffer=DEFAULT |       reply_send_buffer=DEFAULT |
|     DISCONNECT |     DISCONNECT |
|     INCREMENT_TRANSACTION | |
|   END_LOOP |   END_LOOP |
|   END_TIMER | |
|   SLEEP | |
|     transaction_delay=0 | |
| END_LOOP | END_LOOP |

| Variable Name | Default | Description |
|---|---|---|
| number_of_timing_records | 50 | How many timing records to generate |
| transactions_per_record | 25 | Transactions per timing record |
| size_of_record_to_send | 100 | Amount of data to be sent |
| inquiry_send_buffer | DEFAULT | How many bytes of data in each SEND |
| inquiry_receive_buffer | DEFAULT | How many bytes of data in each RECEIVE |
| delay_before_responding | 0 | Milliseconds to wait before responding |
| reply_size | 100 | Amount of data to be sent |
| reply_send_buffer | DEFAULT | How many bytes of data in each SEND |

-continued

| | | |
|---|---|---|
| reply_receive_buffer | DEFAULT | How many bytes of data in each RECEIVE |
| transaction_delay | 0 | Milliseconds to pause |

PACKETL Script

This is a Packet Transmit (Long Send) transaction, which uses a long connection. This long-running transaction continuously sends packets from Endpoint 1 node 14, 15 to Endpoint 2 node 16, 17. This may not be a good transaction for benchmarking because it does not acknowledge that data has been received. Measurements can be inaccurate, because the script ends without waiting for the receiving side to catch up. This test uses the FLUSH script command. While it has no effect on TCP/IP, it causes APPC to send data immediately, rather than waiting to fill buffers. This script is suitable for generating background traffic. Depending upon the network protocol chosen, this script allows some control over the packet size used at the Data Link Control layer.

console node 20 resides. Scenario scripts and the results of runs may be saved by console program 26 for review by a user.

There are four components that a user interfaces with via console program 26. These components are scenarios, endpoint pairs, scripts and results. Console program 26 includes console graphic user interface 28 and console engine 30 which are preferably implemented as application level programs executing on the computer on which console node 20 resides. Console graphic user interface 28 handles user interactions with the apparatus of the present invention. Console engine 30 does the core data and network processing. Console node 20 includes at least one network protocol stack 32, 32' to talk to endpoint nodes 14, 15, 16, 17, 18.

| Endpoint 1 | Endpoint 2 |
|---|---|
| CONNECT_INITIATE | CONNECT_ACCEPT |
| LOOP | LOOP |
|   number_of_timing_records=50 |   number_of_timing_records=50 |
|   START_TIMER | |
|   LOOP |   LOOP |
|     transactions_per_record=1000 |     transactions_per_record=1000 |
|     SEND |     RECEIVE |
|       size_of_record_to_send=100 |       size_of_record_to_send=100 |
|       send_buffer_size=DEFAULT |       receive_buffer_size=DEFAULT |
|     FLUSH | |
|     INCREMENT_TRANSACTION | |
|   END_LOOP |   END_LOOP |
|   END_TIMER | |
|   SLEEP | |
|     transaction_delay=0 | |
| END_LOOP | END_LOOP |
| DISCONNECT | DISCONNECT |

| Variable Name | Default | Description |
|---|---|---|
| number_of_timing_records | 50 | How many timing records to generate |
| transactions_per_record | 1,000 | Transactions per timing record |
| size_of_record_to_send | 100 | Amount of data to be sent |
| send_buffer_size | DEFAULT | How many bytes of data in each SEND |
| transaction_delay | 0 | Milliseconds to pause |
| receive_buffer_size | DEFAULT | How many bytes of data in each RECEIVE |

Description of Node Architecture

Figure 3:
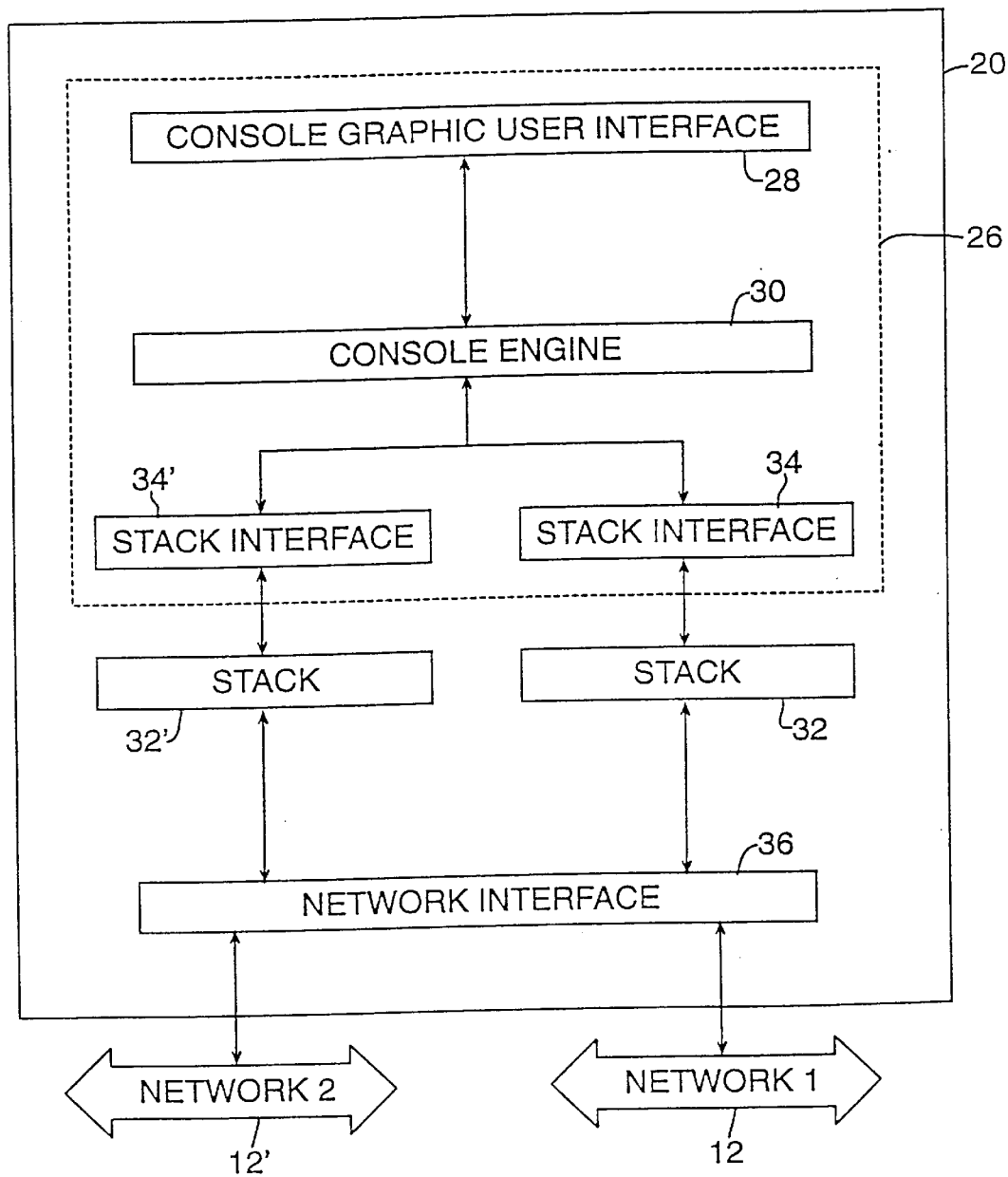
FIG. 3 is a block diagram of an embodiment of a console node according to the present invention.

Referring now to FIG. 3, an embodiment of a console node 20 of the present invention is illustrated. Console node 20 resides on a computer including an interface to at least one communications network 12, 12'. Console node 20 includes console program 26 or other means for executing console operations. Console program 26 preferably is implemented as a console software program executing on the computer of console node 20, but it is to be understood that console program 26 may be implemented in whole or in part with hardware. Console program 26 sets up and controls test runs. Console program 26 communicates with endpoint nodes 14, 15, 16, 17, 18, sending them scripts to run and gathering the results of their runs. Console program 26 allows a user to build scenarios from selected scripts, change the values of the variables associated with a given script and display and print scripts to see what will take place among endpoints 14, 15, 16, 17, 18. Console program 26 can read from and write to files and logs on the computer on which Stack interface program 34, 34' is provided to interface console engine 30 with each network protocol (e.g., TCP/IP, APPC) stack required to be communicated with for a given test.

The separation of the operational components of console node 20 as described above provides various operational advantages. All of the user interface code is provided in one place. This makes it easier to move the interface from computer platform to computer platform. The stack interface program 34, 34', while object oriented and portable in design, may not be strictly portable to different console graphic user interface 28 environments which are dependent upon the particular computer on which console node 20 resides. In addition, the distribution of function between console graphic user interface 28, which may depend upon the particular computer hardware on which console node 20 resides, stack interface 34, 34' which may also lack complete portability to different computer environments, and console engine 30 provides for high portability of console engine 30 code between computer platforms. Stack interface 34, 34' may require special considerations when moving it among network protocol stacks and environments. While it is preferred that calls to stacks 32, 32' be consistent on different hardware products for standards such as CPI-C and Sockets API calls, it is to be understood that, at the present time, there are still individual differences among the stacks between different hardware products on which console node 20 may reside.

Console graphic user interface 28 may be designed as a Windows® or OS/2® Presentation Manager application. Console graphic user interface 28 in an embodiment of the present invention may provide file functions, viewing functions, option functions and help. File functions are linked to creating new scenario files, opening existing files, saving files or printing files. View functions allow viewing scenarios and results in various formats. Option functions include options which would not necessarily change with each test scenario such as user preference setups for running scripts and viewing the results, default directories, and start-up options. Console graphic user interface 28, when implemented in a Windows-type environment, may also provide a separate scenario window and result window. A scenario window may provide for actions associated with setting up and activating a scenario. A results window may include actions related to printing and viewing results of a test run. The various functions available to the user through graphic user interface 28 generate appropriate calls from console graphic user interface 28 to console engine 30. Console graphic user interface 28 is preferably programmed using an object-oriented programming structure. Console graphic user interface 28 may be provided with several threads. The main thread will handle quick tasks and a second thread will handle long running tasks. Additional threads may be implemented as required to handle asynchronous background tasks such as printing.

Console engine 30 reacts to calls from console graphic user interface 28 and to calls from underlying protocol stacks 32, 32'. Console engine 30 may receive calls from console graphic user interface 28 and handles them without blocking—for example, opening a file or running a scenario. Similarly, it can call console graphic user interface 28 at any time providing it with events or unsolicited information—for example, supply and return results or reporting a hang in a scenario.

Console engine 30 also interacts with network protocol stack 32, 32'. Stack interface 34, 34' provides for facilitating the interaction between console engine 30 and stacks 32, 32' to provide for greater portability of console engine 30. Console engine 30 both initiates transaction flows through stacks 32, 32' and handles information arriving from communications network 12 via stacks 32, 32'. For example, console engine 30, or other communicating means, provides test protocols including scripts and start-up information to endpoint nodes 14, 15, 16, 17, 18 for a scenario. Preferably, the endpoint information is provided by console engine 30 over network 12. Console engine 30 also handles unsolicited information arriving from endpoint nodes 14, 15, 16, 17, 18—for example, returned timing records or other performance data. Console engine 30 can utilize many stacks 32, 32' simultaneously and converse with multiple endpoint nodes 14, 15, 16, 17, 18 at the same time.

Console engine 30 also provides functions for file input/output and printing. Console graphic user interface 28 issues calls that request a file to be opened or saved to which console engine 30 responds by handling the actual file operations.

Internally, console engine 30 deals with objects and their associated functions. For example, it creates a new "scenario object" each time it starts a new scenario (or has an existing one opened from a file). Console engine 30 can also "set" and "extract" various pieces of data from a scenario. Console engine 30 further insures the syntactic and semantic correctness of scripts before they are sent to endpoint nodes 14, 15, 16, 17, 18. Console engine 30 sets up the script to transmit so that endpoint nodes 14, 15, 16, 17, 18 will not have much, if any, activity in parsing of the received scripts. Accordingly, console engine 30 in cooperation with a first endpoint node 14, 15 of each endpoint node pair 22, 24 provides means for determining a partner endpoint node test protocol from the endpoint node specific network communication test protocol determined by console engine 30. Preferably, first endpoint node 14, 15 of each endpoint node pair 22, 24 provides means for communicating the partner endpoint node test protocol to associated second endpoint nodes 16, 17 although, alternatively, console node 20 may include means for communicating this information to associated second endpoint nodes 16, 17.

Console engine 30, or other terminating means, may provide for terminating execution of test protocols. Execution may be terminated of all test protocols under a test scenario when any one of the test protocols is completed. Alternatively, a test scenario may terminate after all test protocols have completed.

Stack interface module 34, 34' is provided so that calls by console engine 30 may be made without knowing the specific details of the network protocol stack being used. This allows console engine 30 to use a generic set of functions to perform communications including the following: connect_initiate, connect_accept, send, receive, flush, confirm_request, confirm_acknowledge and disconnect. Stack interface 34, 34' ports these generic functions to specific network protocols such as APPC, TCP/IP or other network protocols. The network interface protocol apparatus, or other network interface means for connecting console node 20 to network 12 for communications over network 12, is illustrated in FIG. 3 as network interface 36. Network interface 36 provides console node 20 means for communicating with endpoint nodes 14, 15, 16, 17, 18 over network 12 for communicating endpoint information including test protocols, for initiating execution of test protocols in a test scenario and for receiving reported monitored performance data from endpoint nodes 14, 15, 16, 17, 18 and for terminating execution of a test scenario on network 12.

Figure 4:
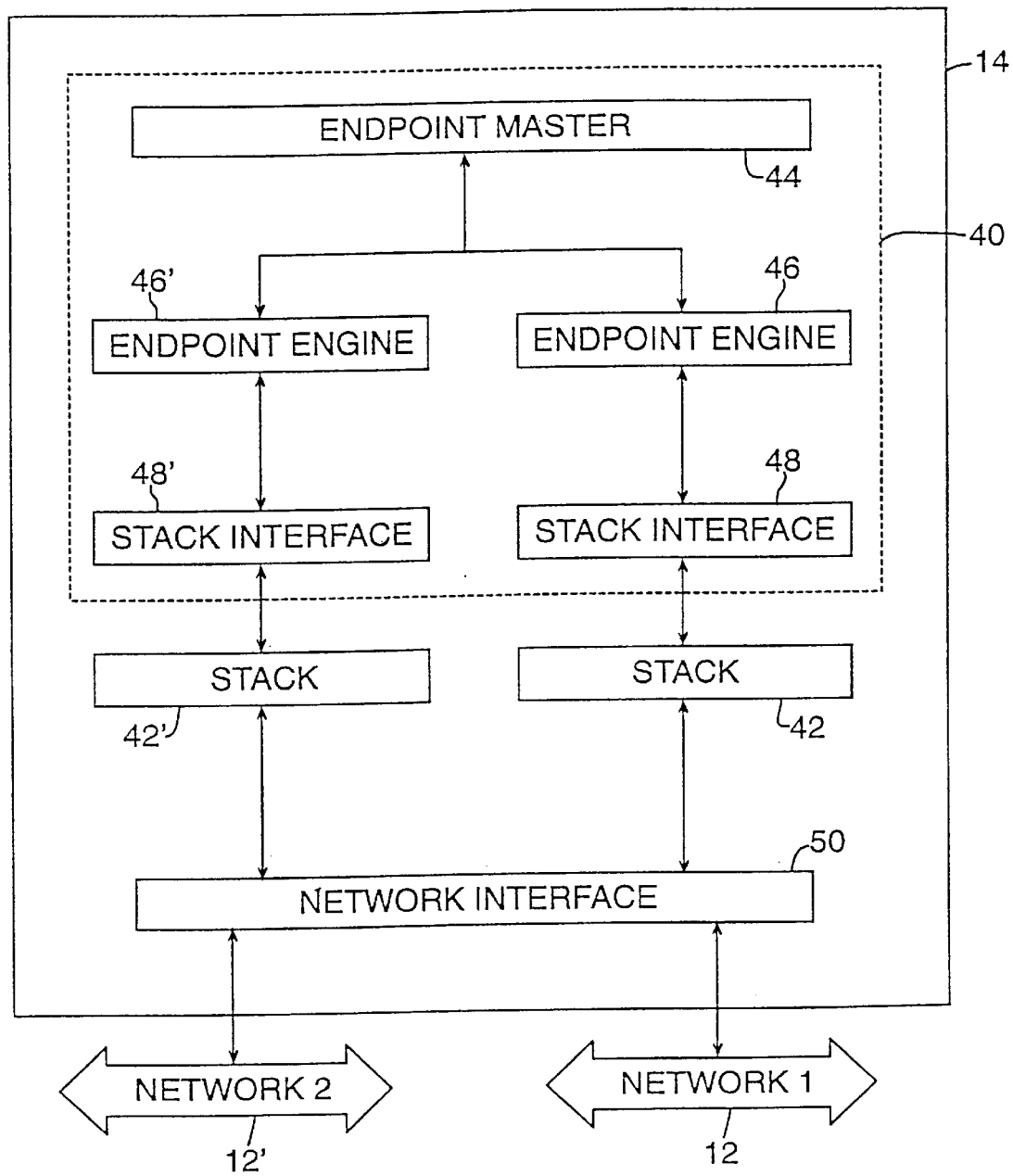
FIG. 4 is a block diagram of an embodiment of an endpoint node according to the present invention.

Referring now to FIG. 4, an embodiment of an endpoint node 14 of the present invention is illustrated. The description of FIG. 4, while directed to endpoint node 14, applies generally to endpoint nodes 14, 15, 16, 17, 18. Endpoint node 14 preferably resides on a computer as an application level program executing on the computer. It is to be understood that a plurality of endpoint nodes 14 may reside on a single computer. Endpoint node 14 may also reside on the same computer as console node 20.

It is to be understood that endpoint node 14 and console node 20 can be implemented by computer program instructions. These computer program instructions may be loaded onto a computer or other programmable data processing apparatus to produce a machine, such that the instructions which execute on the computer or other programmable data processing apparatus create means for implementing the functions of endpoint node 14 and console node 20. These computer program instructions may also be stored in a computer-readable memory that can direct a computer or other programmable data processing apparatus to function in a particular manner, such that the instructions stored in the computer-readable memory produce an article of manufacture including instruction means which implement the functions of endpoint node 14 and console node 20. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions of endpoint node 14 and console node 20.

Endpoint node 14 includes endpoint logic or program 40. Endpoint program 40 handles a variety of functions related to processing flows and executing scripts. Endpoint program 40 reacts to calls from network protocol stacks 42, 42'—for example, to set endpoint node 14 up to begin executing a scenario or to handle a "stop" command received from console node 20. Endpoint program 40 also reports unsolicited events—for example, timing records or reports of some network malfunction to console node 20. Unlike applications testers which operate by acting as a keyboard or screen interface to installed application programs, endpoint program 40 preferably executes as an application program directly communicating with network protocol stacks 42, 42' rather than communicating through other application programs which then communicate with network protocol stacks 42, 42'.

Endpoint program 40 includes endpoint master 44. Endpoint master 44, or other endpoint master means, acts as a manager for starting up additional threads of execution or endpoint engines 46, 46' when console node 14 initiates a scenario. Endpoint master 44 accepts incoming connections from console node 20 via any supported protocol such as APPC or TCP/IP. Endpoint master 44 also accepts stop requests from console node 20 and advises endpoint engine 46, 46' that console node 20 has requested a stop. Endpoint master 44 is preferably prestarted before execution of any task to reduce the protocol configuration that is required at the endpoint.

Endpoint master 44 is contacted during pre-setup by console node 20. Endpoint master 44 is responsible for checking the list of test capability requirements and responding appropriately to console node 20 if the computer on which endpoint node 14 resides is not capable of meeting the requirements for the testing. Endpoint master 44 also insures that any endpoint engine 46, 46' can be contacted through the program name specified in the test script. Endpoint master 44 returns to console node 20 the appropriate script program name. Endpoint master program 44 further insures that any stop commands from console node 20 during execution of a test will be received and that endpoint engine 46, 46' will be stopped accordingly. Endpoint engine 46, 46', or other endpoint engine means for receiving test protocols from console node 20 and for executing test protocols, is contacted directly by console node 20 for setup and run of specific test protocol scripts during a test. Endpoint master 44 is started before any message arrives from console node 20. In order to do this, endpoint master 44 initializes itself with information such as what APPC TP name, TPC port address, (or equivalent) to expect. Endpoint master 44 waits for network protocol stacks 42, 42' to be brought up and then listens for messages from console node 20 or other endpoint nodes 15, 16, 17, 18.

Endpoint engine 46, 46' handles endpoint node 14 operations during test scenarios. Multiple endpoint nodes 14 may be implemented for a test by executing a plurality of endpoint engines 46, 46' on a single computer station or on a variety of stations. It is to be understood that an endpoint engine acts to simulate a single user application interface to a network protocol stack 42, 42'. Accordingly, a plurality of endpoint engines 46, 46' can be executing on endpoint node 14 even if endpoint node 14 only includes a single physical connection to network 12.

Running a large number of endpoint nodes 14,15,16,17,18 on a single computer can create distinct results. For example, in both TCP/IP and APPC, the protocol stacks will allow scripts that create large data flows, such as file transfers, to dominate access to the protocol stack. This means that a disproportionate percentage of the data traffic will come from the larger transactions. Therefore, if the objective of a test scenario is to get a good mix of small and large transactions, it is preferable to use one endpoint node for each type of transaction. In addition, even though multitasking operating systems are supposed to be "fair" about giving different processes equal amounts of time, variations occur. For example, when running 20 connections on one OS/2 system, it is typical to encounter a 20% difference in performance between the highest and lowest. However, if a test is directed to testing an intermediate system, such as a switch or router, this doesn't make much difference, because the applicable test results are the aggregate throughput of all endpoint pairs 22, 24.

Endpoint engines 46, 46' perform the functions of both endpoint nodes of an endpoint pair 22, 24. For example, with reference to FIGS. 2 and 4, endpoint engine 46, 46' acting as an endpoint 1 node 14, 15 always initiates the connection in a script and generates the timing records. Endpoint engine 46, 46' acting as an endpoint 2 node 16, 17 always accepts incoming connections. Endpoint engines 46, 46', or other endpoint node monitoring means, provides means for monitoring performance of network 12 during execution of the endpoint node specific test protocol to obtain performance data such as timing records and means for reporting the performance data to console node 20. Performance data may be reported after the test protocols have completed execution or been terminated or during executio of test protocols. Console engine 30, or other receiving means provides means for receiving the reported performance data. Accordingly, console engine 30 in cooperation with endpoint engines 46, 46' provide monitoring means for monitoring performance of network 12 during execution of test protocols to obtain performance data.

Stack interface 48, 48', or other stack interface means for interfacing endpoint engines 46, 46' to protocol stacks 42, 42' residing on the endpoint node computer to thereby provide access to network 12 for executing test protocols, provides similar functions for endpoint node 14 as is provided by stack interface 34, 34' of console node 20. Likewise, network interface 50, or other endpoint network interface means for operatively connecting endpoint node 14 to network 12, of endpoint node 14 serves a similar function for endpoint node 14 as network interface 36 serves for console node 20.

By providing endpoint master 44 and at least one endpoint engine 46, 46', endpoint node 14 is able to mix network protocols and handle multiple scripts concurrently. It is to be understood that this may be accomplished in a variety of ways in different hardware/software environments. For example, this function may be accomplished by the use of multi-threading in OS/2. In a Windows environment, multiple instances of the same programs monitored by endpoint master 44 may be implemented as illustrated in FIG. 4. In the embodiment illustrated in FIG. 4, endpoint master 44 is provided to handle events from console node 20. Endpoint engine 46, 46' provides endpoint node 14 the capability to converse with console node 20 and multiple other endpoint nodes 15, 16, 17, 18 at the same time.

Console engine 30, or other means for analyzing, provides means for analyzing reported performance data from endpoint node 14 or other selected reporting endpoint nodes 15, 16, 17, 18 to generate performance measurements. Performance measurements may include throughput and transaction rate. Response time may also be generated as a performance measurement.

Console node 20, or other means for detecting communications capabilities, may detect communications capabilities of endpoint node 14, 15, 16, 17, 18 before initiating execution of a test scenario. A presetup flow, an example of which is given in the PROGRAM FLOW EXAMPLES section of this detailed description, is sent from console node 20 to each endpoint node 14, 15, 16, 17, 18 in the test scenario. The presetup flow may include a requirements list. The requirements list may include a string of bytes which indicate what communications capabilities endpoint node 14, 15, 16, 17, 18 need to support in order to execute their endpoint node specific test protocol under the test scenario. For example, if a test scenario uses APPC as the network protocol between an endpoint node pair 22 and the test script involves short connections, the endpoint nodes of endpoint node pair 22 should support the following items which would be in the requirements list: APPC, and Multiple Accept (an optional feature of APPC which allows back-to-back conversations).

Each endpoint node 14, 15, 16, 17, 18 looks at the items in the received requirements list. If it supports these items, it responds positively to the presetup flow. Otherwise, it responds negatively and may return a list of the items it does not support. The returned information may be used by console node 20 for user diagnostics and execution of the test scenario may be cancelled.

Console node 20, or other means for detecting active network protocol stacks, may detect the presence of loaded protocol stacks on endpoint node 14, 15, 16, 17, 18. When console engine 30 and endpoint engine 46, 46' are started, they may determine if they have access to shared libraries they need. Network protocol stacks are, typically, accessed via shared libraries as these offer an application programming interface (API), a set of network calls available to any application level program. If console engine 30 and endpoint engine 46, 46' can access the shared libraries, they know at least that the network protocol code has been installed in the computers on which they reside.

If the shared libraries are installed, console engine 30 and endpoint engine 46, 46' may make API calls to them. If network protocol stacks are active, the calls succeed with return codes indicating that the stack is active. Otherwise, the return codes indicate that the stacks are either not activated or have abended. Console engine 30 and endpoint engine 46, 46' may retry their access to the shared libraries periodically so they can detect when an inactive stack becomes active.

Performance Testing Operations

FIGS. 5–10 are flowchart illustrations of methods, apparatus (systems) and computer program products according to the invention. It will be understood that each Block of the flowchart illustrations, and combinations of Blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart Block or Blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart Block or Blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart Block or Blocks.

Accordingly, Blocks of the flowchart illustrations support combinations of means for performing the specified functions, combinations of steps for performing the specified functions and program instruction means for performing the specified functions. It will also be understood that each Block of the flowchart illustrations, and combinations of Blocks in the flowchart illustrations, can be implemented by special purpose hardware-based computer systems which perform the specified functions or steps, or combinations of special purpose hardware and computer instructions.

Referring now to the flowchart of FIG. 5 as continued in FIG. 5A, an overview of operations of an embodiment of the present invention will be described. At Block 60, console node 20 is added for communications network 12. At Block 62, console node 20 determines the type of application communication traffic expected on communications network 12 including defining a test protocol scenario to simulate communications traffic between endpoint nodes 14, 15, 16, 17, 18 to be tested. At Block 64, console node 20 assigns a first network communication test protocol to first endpoint node 14 based on the type of application communication traffic expected as determined at Block 62. At Block 66, operation returns to Block 64 to assign a second network communication test protocol to a second endpoint node 15, 16, 17, 18 based on the type of application communication traffic expected as determined at Block 62. Depending upon the number of endpoint nodes 14, 15, 16, 17, 18 designated in the scenario defined at Block 62, the "yes" path continues to be taken at Block 66 until all endpoint nodes 14, 15, 16, 17, 18 have had a network communication test protocol assigned.

At Block 68, console node 20 initiates execution of the first network communication test protocol, the second network communication test protocol and any other protocols assigned to endpoint nodes 14, 15, 16, 17, 18. Before initiating the test at Block 68, the underlying network software, such as APPC and/or TCP/IP, is configured and active at console node 20 and any endpoint nodes 14, 15, 16, 17, 18 which will be designated for running during the test protocol scenario. Referring now to FIG. 5A, after initiation of the scenario at Block 68, the performance of communications network 12 is monitored while the test protocols are executed at Block 70.

At Block 72, console node 20 determines if the test protocol for the scenario defined at Block 62 is complete. If not, endpoint nodes 14, 15, 16, 17, 18 continue to monitor performance of the network during the scenario at Block 70. When the test protocol scenario defined at Block 62 is completed, operations move to Block 74 and console node 20 terminates execution of the first network communication test protocol, the second network communication test protocol, or any network communication test protocol under the scenario defined at Block 62 which is still operating. At Block 76, the monitored performance information from Block 70 is reported to console node 20 from selected ones of endpoint nodes 14, 15, 16, 17, 18.

In one embodiment of the present invention, all the preceding operations which involve passing information between console node 20 and endpoint nodes 14, 15, 16, 17, 18 are transmitted on communications network 12. The computer on which endpoint nodes 14, 15, 16, 17, 18 reside can have multiple network addresses. For example, it is common for a computer with multiple adapters to have multiple IP addresses. In one embodiment of the present invention, one of the multiple IP addresses at endpoint node 14, 15, 16, 17, 18 is designated for communications between endpoint nodes 14, 15, 16, 17, 18 during execution of a test protocol scenario. Another of the multiple IP addresses is designated for communications with console node 20.

At Block 78, console node 20 analyzes the reported monitored performance information from Block 76 to generate performance measurements. The generated performance measurements are measurements based on communications transactions during the test which can be measured by reference to time. These measurements include throughput, transaction rate, and response time.

Figure 5:
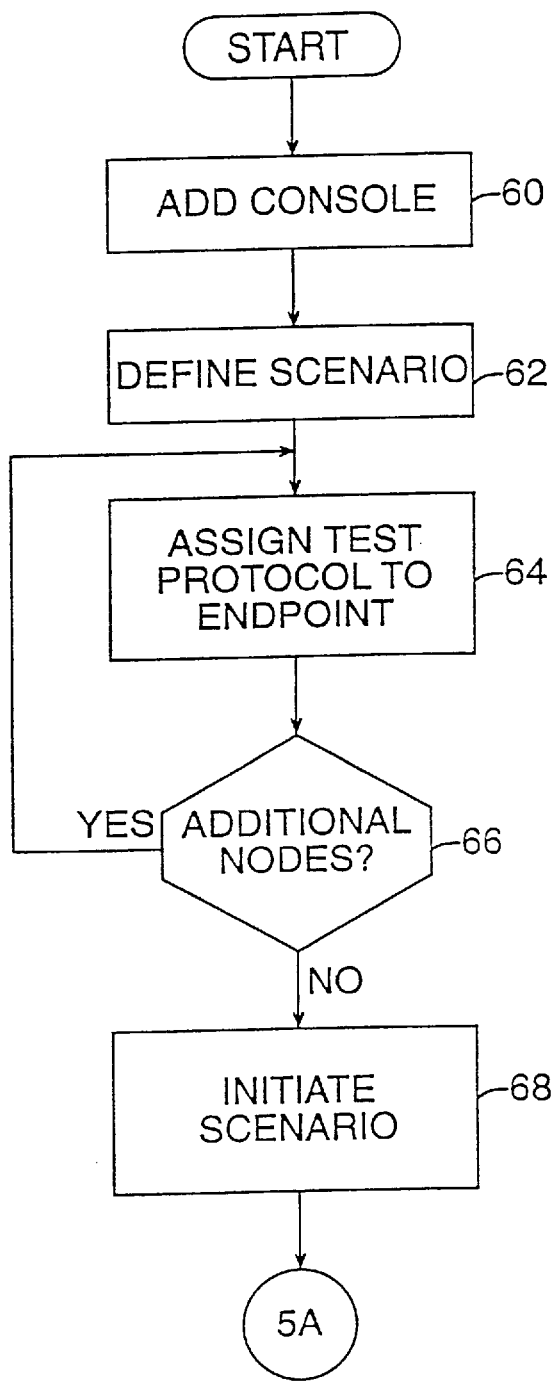
FIG. 5 is a flow chart illustrating operation of an embodiment for testing performance of a communication network according to the present invention.
Figure 5A:
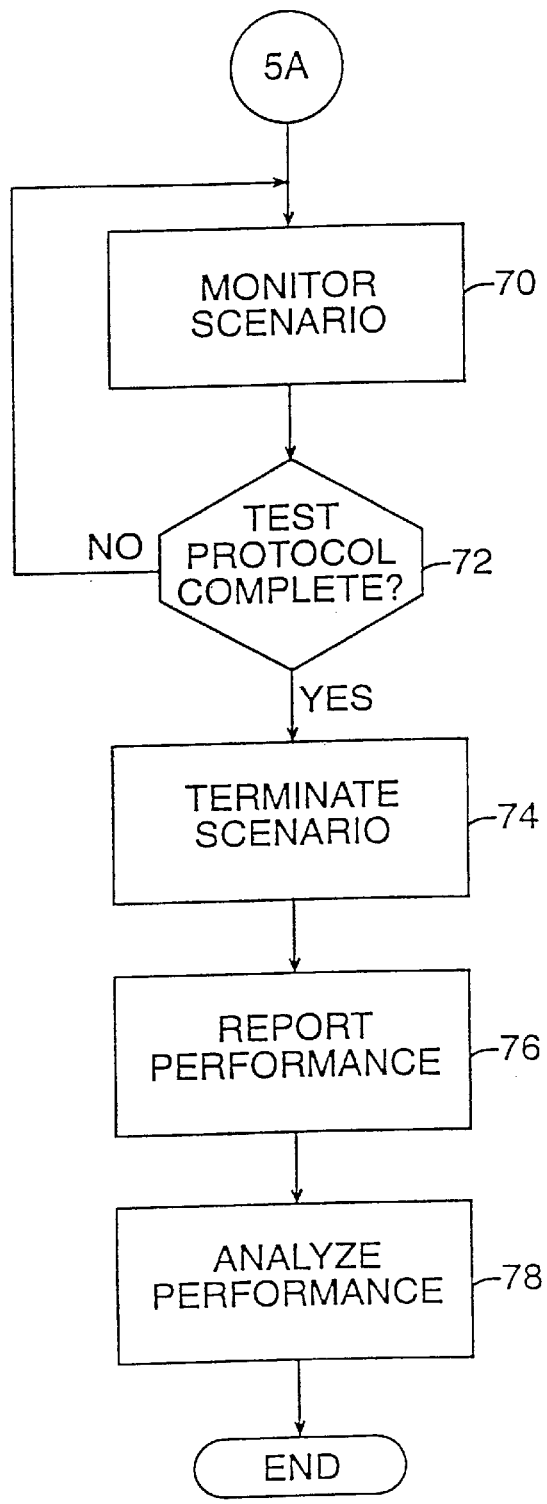
FIG. 5A is a continuation of the flow chart of FIG. 5.

In the embodiment of the present invention illustrated in FIGS. 5 and 5A, batch reporting of performance results at Block 76 is used following termination of the scenario at Block 74. However, while it is not illustrated in FIGS. 5 and 5A, it is to be understood that real time performance reporting can also be beneficially utilized in practicing the present invention. In real time reporting, rather than delay reporting of performance data until following termination at Block 74, performance reporting is done during monitoring of the scenario at Block 70.

In real time reporting, every time a timing record is created, it is sent back to console node 20. This allows console node 20 to update the results window for display to a user as the timing records are received, allowing the user to see how the test is progressing. However, while real time reporting is useful for verifying tests, real time operations can have negative affects on the test being run due to the extra network traffic of real time operation being transmitted over network 12 while a scenario is executing. In contrast, batch reporting as illustrated in FIGS. 5 and 5A, avoids network traffic created by timing records and prevents transmission of timing records from interfering with the actual performance measurements.

Figure 6:
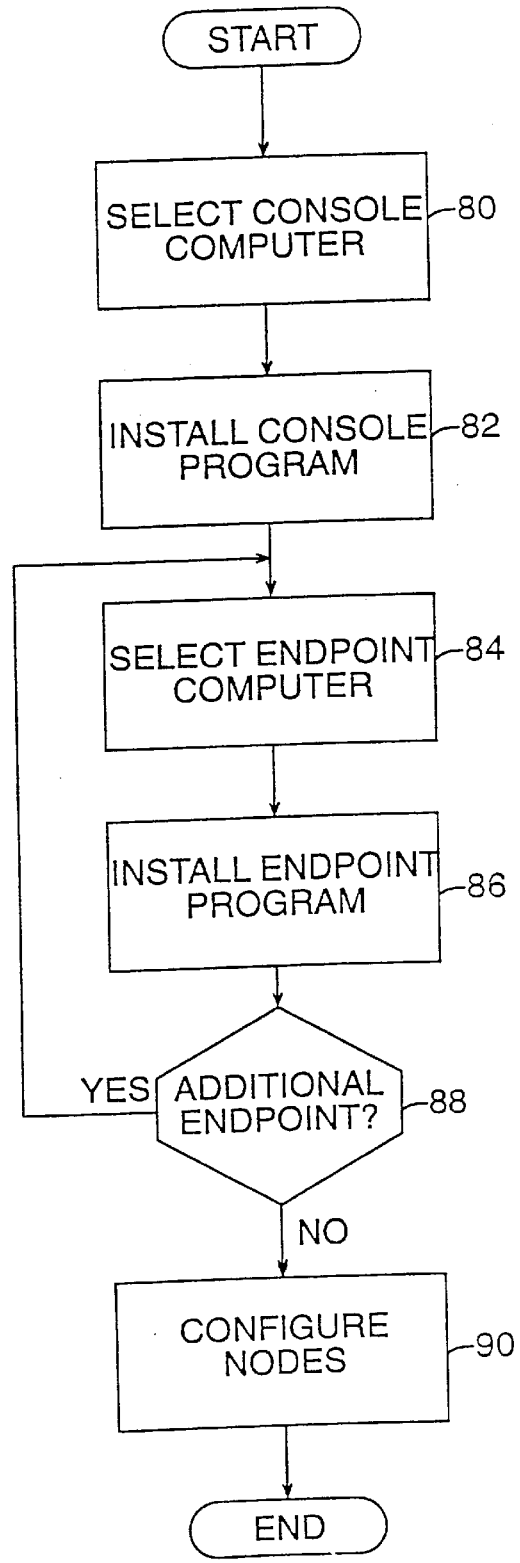
FIG. 6 is a flowchart illustrating operations for adding a console node according to an embodiment of the present invention.

Referring now to FIGS. 1 and 6, the operations from Block 60 of FIG. 5 will be described more fully for an embodiment of the present invention. The present invention is directed to performance testing of communications network 12 which, as illustrated in FIG. 1, includes a plurality of computer nodes 14, 15, 16, 17, 18, 20. To practice the present invention, one node on communications network 12 is selected as console node 20 at Block 80. With reference to FIG. 1, the computer on which node 20 resides is designated as console node 20. At Block 82, console program 26 is installed at console node 20. At Block 84, a first endpoint node computer is selected—for example, the computer on which endpoint node 14 resides as shown in FIG. 1. At Block 86, endpoint program 40 is installed on the computer on which endpoint node 14 resides. At Block 88, if additional endpoint nodes 15, 16, 17, 18 are desired for testing of communications network 12, additional endpoint nodes 15, 16, 17, 18 are selected as endpoint nodes at Block 84 and on each additional endpoint node 15, 16, 17, 18 selected, endpoint program 40 is installed at Block 86.

At Block 90 all of the designated nodes are configured. In practicing an embodiment of the present invention, console program 26 and endpoint program 40 operate as application-level programs much like commercially available programs such as Lotus Notes and FTP. Accordingly, they interact over communications network 12 with network protocols such as APPC and TCP interfaces for their network communications. The operations at Block 90 insure proper communications between console program 26 and endpoint program 40 on communications network 12 using a network protocol. The operations at Block 90 include determining the network addresses of endpoint nodes 14, 15, 16, 17, 18 and control node 20, selecting service quality for tests where available from the network protocol and, preferably, testing the network connections.

An example of the operations at Block 90 in an APPC environment will now be briefly described. Additional information describing the setup of APPC across a variety of platforms is provided in the *Multi-Platform Configuration Guide* (MPCONFIG) and is available from IBM. In an APPC network environment, a fully qualified LU name is the easiest network address to use when practicing the present invention. It is constructed by concatenating the network name, a period, and a control point (CP) or LU name. Although multiple LUs may be defined at a single computer, one always serves the role of the control point LU.

APPC allows service quality to be selected through a mode definition. Standard modes available include #INTER, #INTERSC, #BATCH, and #BATCHSC. Additional mode names exist for particular applications which may be beneficially utilized with the present invention if such applications are the type of application communication traffic which is expected on communications network 12.

It is also preferred under APPC to properly set the session limits at Block 90. The predefined modes listed above include a session limit of 8 which only allows 8 sessions at a time between a pair of machines using the same mode name. To run larger tests, a new mode can be created on each computer executing a test protocol script under APPC. It is also preferred that the LUs and modes determined be checked before execution of a performance test. This can be accomplished using the APING command. APING is a test application included with many APPC implementations.

Block 90 operations in a TCP/IP environment will now be described briefly. TCP offers two forms of network addresses. The IP address is a 32-bit numeric address. It is represented in a dotted notation as a set of four numbers separated by periods, such as 199.72.46.201. The alternative, domain names, provide a format that is easier to recognize and remember, such as www.GanymedeSoftware.com. To use domain names, a domain name server (DNS) is required on communications network 12.

TCP/IP does not provide service quality for its applications. As with APPC, a simple test program, PING, which is included with all TCP/IP implementations, may be used to test network connections.

Figure 7:
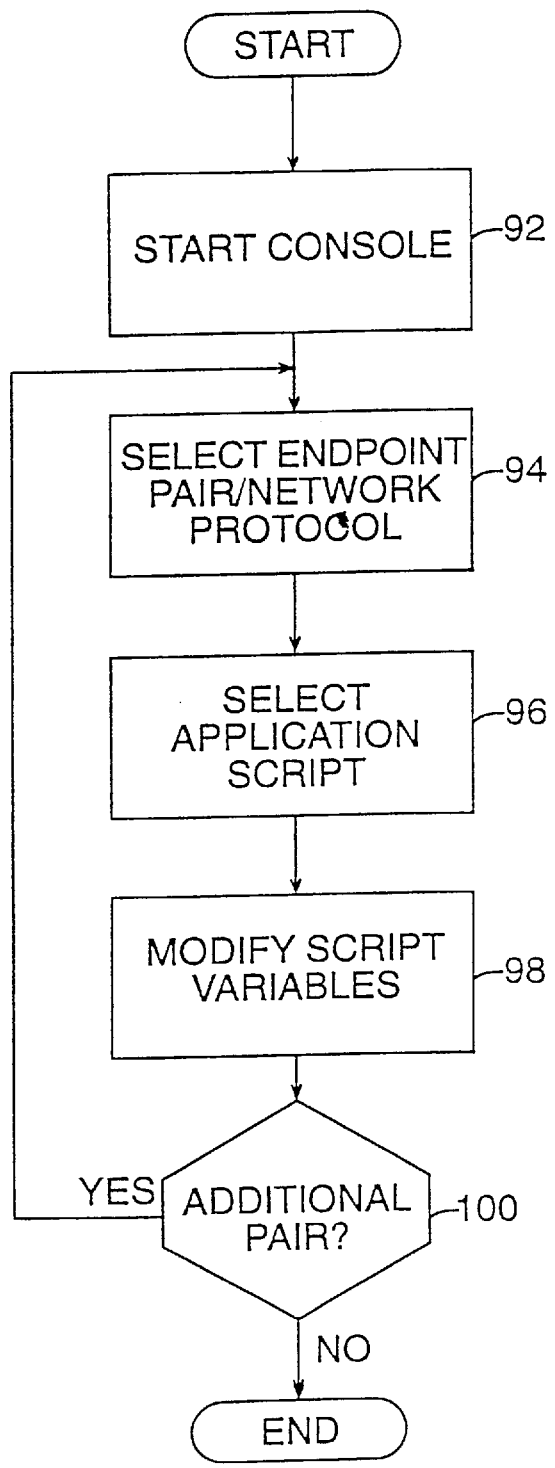
FIG. 7 is a flowchart illustrating operations for defining a test scenario according to an embodiment of the present invention.

Referring now to FIG. 7, the operations at Block 62 of FIG. 5 will be described in more detail for an embodiment of the present invention. At Block 92, console program 26 is started by the user on console node 20. More specifically, the user interfaces through the console graphic user interface 28. As illustrated in FIG. 7, the steps are shown for creating a new scenario. Alternatively, a scenario may be saved from a previous test and reopened and re-executed.

At Block 94, a first endpoint pair for the test protocol scenario is selected. For example, referring to FIG. 2, endpoint node 14 and endpoint node 16 may be selected to define endpoint node pair 22. The network protocol to be used and service quality for communications between endpoint node 14 and endpoint node 16 are also selected at Block 94. Endpoint pair 22 is designated by specifying the network address of endpoint 1 node 14 and endpoint 2 node 16 based on the network protocol to be used (e.g., TCP/IP, APPC). The network address convention for TCP/IP and APPC have been described above.

Console node 20 maintains endpoint node 14, 15, 16, 17, 18 alias and network names and the underlying network protocol in memory at console node 20 after the names are determined. When a user enters a new name, selecting an endpoint node 14, 15, 16, 17, 18 at Block 94, console node 12 first searches the saved alias list. If a corresponding name is found in the alias list at console node 20, the associated network name is then used in defining the scenario. If the user only identifies an endpoint node 14, 15, 16, 17, 18 by network name, the network name is used in defining the scenario but is not added to the alias list. Finally, if the user provides both the alias and the network name, the network name is used in defining the scenario and the alias and network name are added to the saved alias list at console node 20 if the pair is unique. Using TCP/IP where only an alias name is provided, console node 20 further attempts to determine the associated network name by use of the TCP/IP gethostbyname( ) call.

At Block 96, an application test protocol script is selected for communications by endpoint node pair 22, 24. Examples of different types of application scripts have been described above.

At Block 98, variables associated with the selected script may be varied from their default values based upon the type of application communication traffic expected on communications network 12. For example, with the credit check long connection script described above, the variables which can be adjusted from the default values include number_of_timing_records, transactions_per_record, size_of_record_to_send, send_buffer_size, receive_buffer_size, transaction_delay, and delay_before_responding. At Block 100, if an additional endpoint pair 22, 24 is desired for the scenario, operation returns and repeats the steps at Blocks 94, 96, and 98.

Figure 8:
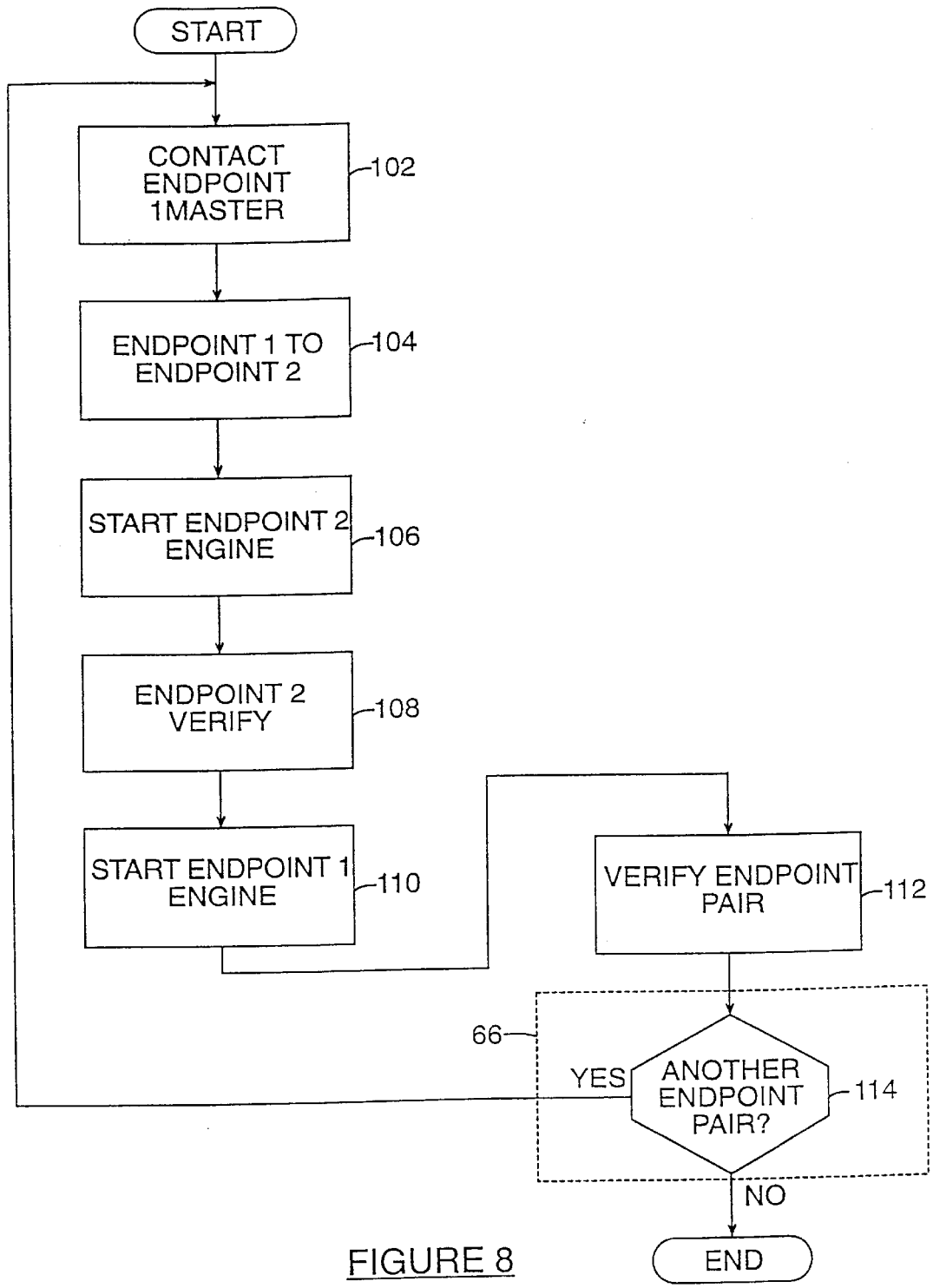
FIG. 8 is a flowchart illustrating operations for assigning test protocol scripts to endpoint pairs according to an embodiment of the present invention.

Referring now to FIG. 8, the operations at Blocks 64 and 66 from FIG. 5 will be described for an embodiment of the present invention. For the purpose of this description, the network configuration of FIG. 2, including endpoint pairs 22 and 24, will be used for reference in describing the operations in the flowchart of FIG. 8. At Block 102, console node 20 contacts endpoint node 14 to establish a communication connection on communications network 12. Specifically, console node 20 contacts endpoint master 44 of endpoint node 14. If communication is verified between console node 20 and endpoint node 14, console node 20 further assigns a first network communication test protocol script to endpoint node 14 based on the type of application communication traffic to be tested.

At Block 104, endpoint node 14 establishes communications over communications network 12 with endpoint node 16 and passes the necessary portions of the test protocol for communications between endpoint nodes 14 and 16 to endpoint node 16. For purposes of general reference, the endpoint node 14 receiving the protocol from the console node 20 is referred to as endpoint 1 node 14 while the second member of endpoint node pair 22 is referred to as the endpoint 2 node 16.

At Block 106, endpoint 2 node 16 starts execution of an endpoint engine 46, 46' for communications during the execution of the network performance test. At Block 108, endpoint 2 node 16 verifies its readiness to test to endpoint 1 node 14. At Block 110, endpoint 1 node 14 starts its endpoint engine 46, 46' for communications during the network performance test.

At Block 112, endpoint 1 node 14 verifies readiness of endpoint node pair 22 to console node 20. At Block 114, console node 20 determines if an additional endpoint node pair is required for the test scenario and if so, repeats operations for the next endpoint pair 24 at Blocks 102, 104, 106, 108, 110, and 112.

Figure 9:
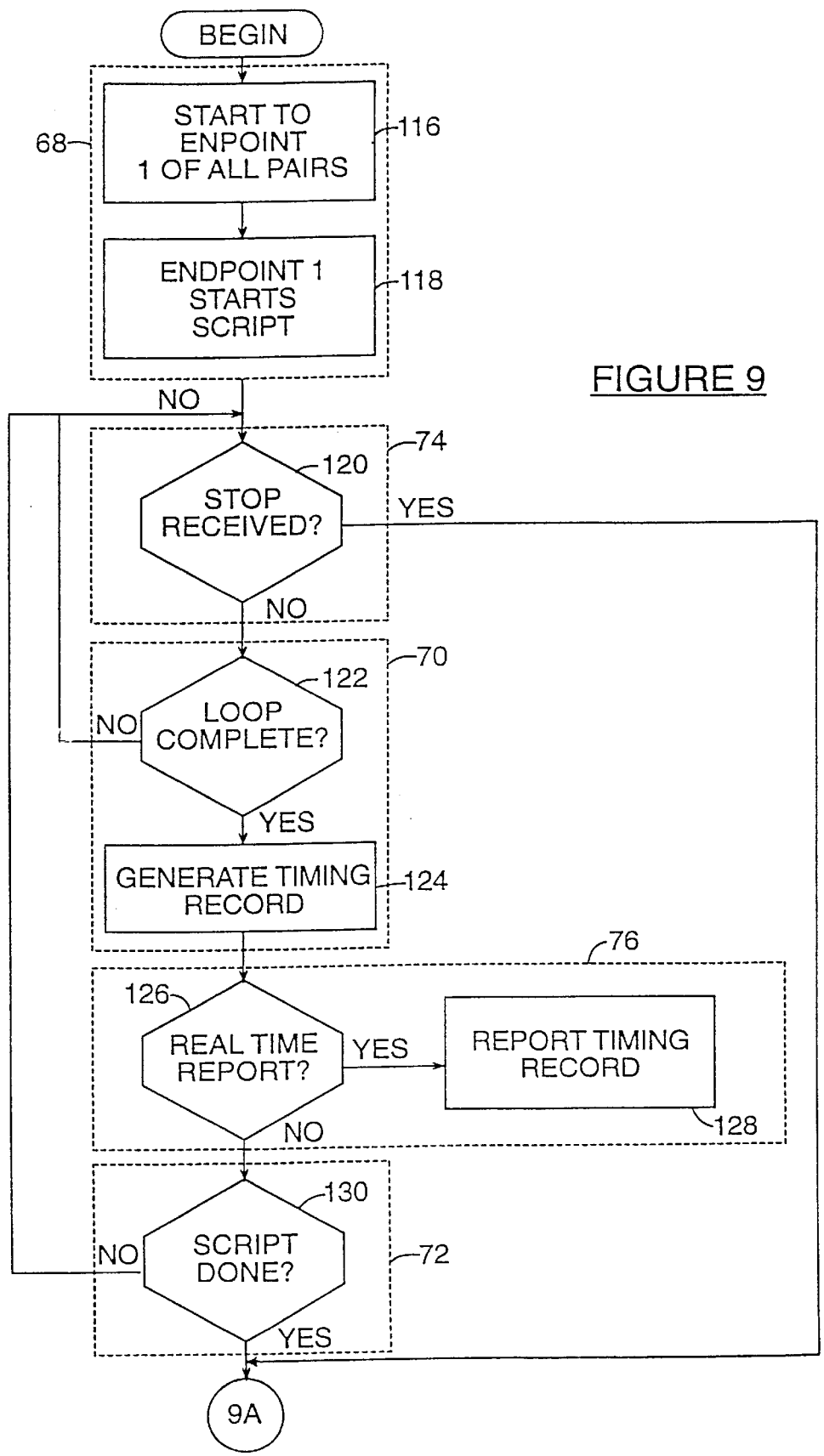
FIG. 9 is a flowchart illustrating operations for initiating and running according to an embodiment of the present invention.
Figure 9A:
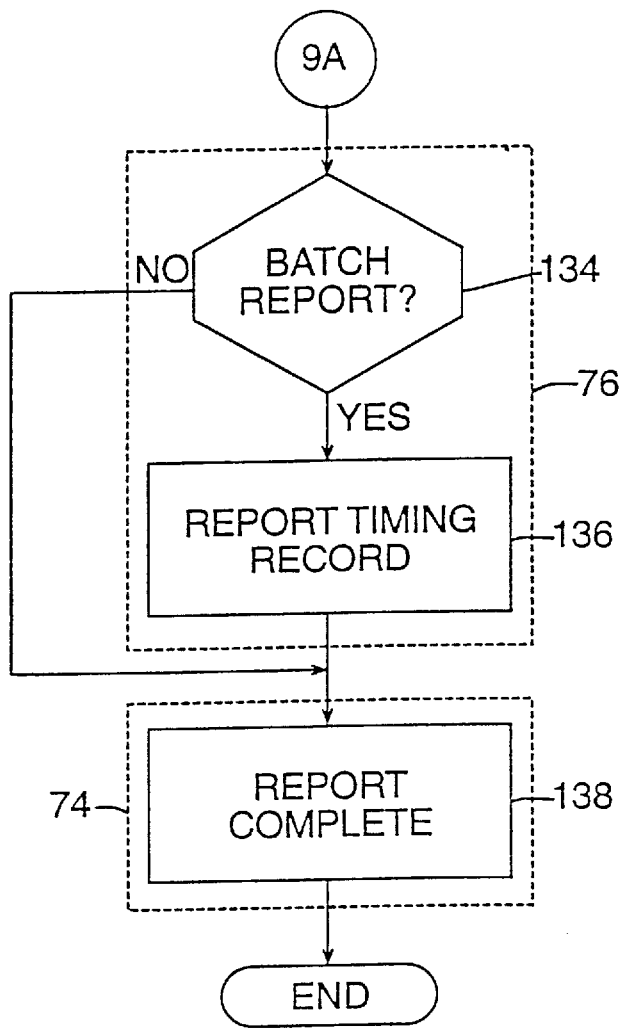
FIG. 9A is a continuation of the flowchart of FIG. 9.

Referring now to FIG. 9 and FIG. 9A, the operations at Blocks 68, 70, 72, 74, and 76 of FIGS. 5 and 5A will be described in more detail. There are two optional ways to determine when a test run is completed. The test scenario determined at Block 62 may either specify continuing a test run until any test protocol script of the scenario completes or until all test protocol scripts in the scenario have run to completion. When the test scenario specifies running until any script completes, the test run is terminated when any one endpoint pair 22, 24 completes executing its test protocol script. Any timing records received after the first endpoint pair 22, 24 completes its test protocol script are discarded. Using this option insures that all timing records used in the analyzing step at Block 78 are generated while all selected endpoint pairs 22, 24 are still running test protocol scripts. Some endpoint pairs 22, 24 can run faster than others depending upon the script variable values, CPU speeds, and network equipment. In fact, depending upon the test scenario, it is possible for some endpoint pairs 22, 24 to have completed their test protocol script before other endpoint pairs 22, 24 have even recorded any timing records. The test scripts and script variables selected for the test scenario are preferably chosen to provide sufficient test duration to obtain a good balance of performance monitoring information among the various selected endpoint pairs 22, 24.

Alternatively, a test scenario may designate the testing continue until all test protocol scripts have been completed. If this option is selected, all endpoint pairs 22, 24 are allowed to run their test protocol scripts to completion. There is a possibility of generating misleading data using this option. The problem occurs as individual test protocol scripts complete, resulting in less competition for available band width on communications network 12. In fact, the last running test protocol script could have communications network 12 all to itself and report much better results than if other test protocol scripts were running concurrently. This is not a problem in a network configuration where endpoint pairs 22, 24 do not share the same network resources, that is, they use different routers and physical media.

Referring now to FIG. 9, at Block 116, console node 20 transmits a start command to endpoint 1 node 14, 15 of all endpoint node pairs 22, 24. At Block 118, endpoint 1 nodes 14, 15 initiate execution of their respective test protocol scripts by endpoint pairs 22, 24. At Block 120, endpoint 1 nodes 14, 15 determine if a stop command has been received from console node 20. A stop command may be generated by console node 20 if the test scenario specifies running until any script completes and another endpoint pair 22, 24 has completed its test protocol script. A stop may also be transmitted by console node 20 if errors have been encountered during execution of the test scenario. If a stop has been received at Block 120, endpoint 1 nodes 14, 15 stop execution of their test protocols. At Block 122, endpoint 1 nodes 14, 15 determine if an individual protocol timing loop has been completed. If a timing loop has completed, endpoint 1 node 14, 15 generates timing records at Block 124.

At Block 126, endpoint 1 node 14, 16 checks if real time reporting has been specified in its test protocol script. If so, at Block 128, endpoint 1 node 14, 15 reports timing records to console node 20. At Block 130, if additional test protocol remains to be completed, operations return to Block 120 to continue generating timing records characterizing network performance.

Referring now to FIG. 9A, when the individual test protocol script for endpoint pair 22, 24 is completed, endpoint 1 node 14, 15 determines at Block 134 if batch reporting of results has been specified by its test protocol script. If so, all timing records generated during execution of the test protocol script are reported to console node 20 at Block 136. As discussed previously, using batch reporting as contrasted with real-time reporting allows for network test performance measurements to be made without the overhead of reporting results during the performance test on network 12. At Block 138, endpoint pairs 22, 24 report completion of their test protocols to console node 20.

Figure 10:
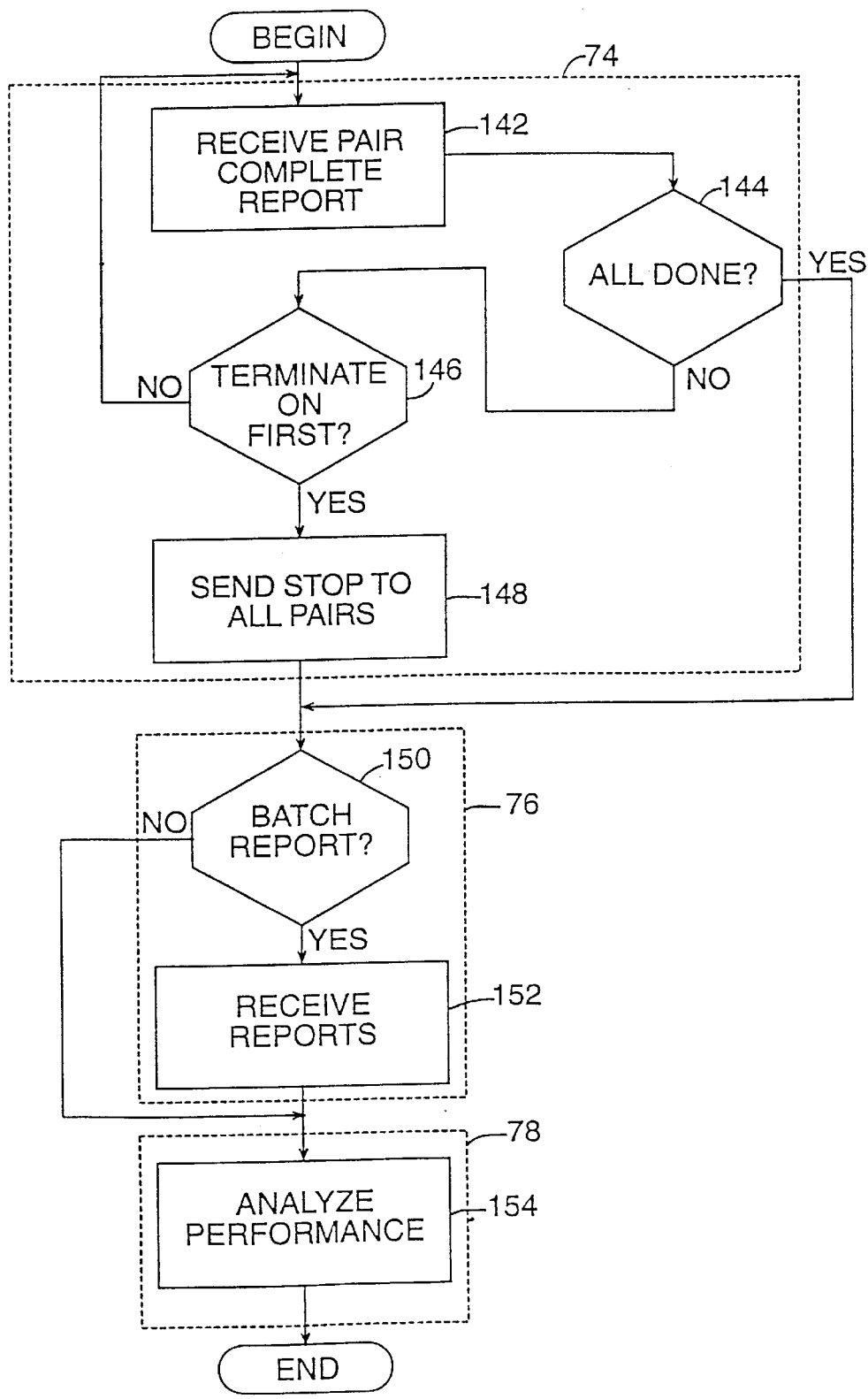
FIG. 10 is a flowchart illustrating operations for terminating a test run through analysis of test performance according to an embodiment of the present invention.

Referring now to FIG. 10, the operation at Blocks 74, 76, and 78 of FIG. 5A will be described from the perspective of console node 20. At Block 142, console node 20 receives from endpoint node pair 22, 24 a report that endpoint node pair 22, 24 has completed its assigned test protocol script. At Block 144, console node 20 determines if all endpoint node pairs 22, 24 for the test scenario being executed have completed their test protocol scripts. If not, at Block 146 console node 20 determines if the executing test protocol calls for termination of all endpoint pair 22, 24 communications on completion of a test protocol script by any one endpoint pair 22, 24. If so, console node 20 sends a stop to the balance of endpoint pairs 22, 24 at Block 148 as soon as any one endpoint pair 22, 24 reports completion. Otherwise, operation returns to Block 142.

Depending upon the option chosen for termination of the scenario, either after the stop has been sent to the remaining pairs at Block 148 or all endpoint pairs 22, 24 complete their test protocols at Block 144, console node 20 determines if batch reporting of timing results has been selected at Block 150. If batch reporting has been selected for the test protocol, then the reports of timing results are received from endpoint pairs 22, 24 by console node 20 at Block 152.

At Block 154, console node 20 analyzes the results of the performance testing. Analysis operations at Block 78 are based on timing measurements and may include providing performance information on throughput, transactions rate, and response time for the overall scenario as well as for individual endpoint pairs 22, 24.

Analysis operations provide various optional report formats presenting information about the performance of communications network 12 to the user. The analysis may include raw data totals as shown in TABLE 5.

TABLE 5

RAW DATA

| Pair | Records | Measured Time (sec) | Transaction Count | Bytes Sent | Bytes Received |
|---|---|---|---|---|---|
| 1 | 100 | 13.312 | 100 | 10,000 | 10,000,000 |
| 2 | 31 | 11.574 | 31 | 3,100 | 3,100,000 |
| 3 | 4 | 11.616 | 100 | 10,000 | 10,000 |
|  |  | aggregate: | 231 | 23,100 | 13,110,000 |

Referring to the columns of TABLE 5, pair shows the endpoint pair number for the corresponding row. This number corresponds to a designated pair number from the test scenario, for example, in TABLE 1. If a given endpoint pair 22, 24 did not generate any timing records during a test, it would not appear as a row. Records refers to a count of the number of timing records generated during the test scenario by its corresponding endpoint pair 22, 24. Measured time indicates the total of the amount of time recorded by all the timing records for the corresponding endpoint pair 22, 24. This may differ greatly from the amount of time the test protocol script was actually running, depending on how much activity or SLEEPs a script performed outside of its START_TIMER and END_TIMER commands. Transaction count refers to the number of transactions performed by the corresponding endpoint pair 22, 24. Sometimes the transaction count equals the number of records. If these two fields differ, it is because the test protocol script used an INCREMENT_TRANSACTIONS command within a LOOP to emulate multiple transactions per timing record. Bytes sent specifies a count of the bytes of data sent by the corresponding endpoint 1 node 14, 15 for the endpoint pair 22, 24. Bytes received reports a count of the bytes of data received by the corresponding endpoint 2 node 16, 17 for endpoint pair 22, 24.

In addition to the raw data totals, network performance results from analysis operations at Block 154 may also be reported as in the example of TABLE 6.

TABLE 6

EXAMPLE DATA

| Pair | Measured Time (sec) | Average (KBps) | 95% Conf. Interval | Minimum (KBps) | Maximum (KBps) | Average (Mbps) |
|---|---|---|---|---|---|---|
| | | | Throughput: | | | |
| 1 | 13.312 | 734.329 | +/−79.118 | 273.056 | 1051.117 | 6.016 |
| 2 | 11.574 | 261.826 | +/−272.944 | 16.049 | 626.628 | 3.145 |
| 3 | 11.616 | 1.681 | +/−3.374 | 0.581 | 4.820 | 0.014 |
| | aggregate: | 997.836 | | 0.581 | 1051.117 | 8.174 |

TABLE 6-continued

EXAMPLE DATA

| Pair | Measured Time (sec) | Average (#/sec) | 95% Conf. Interval | Minimum (#/sec) | Maximum (#/sec) |
|---|---|---|---|---|---|
| | | | Transaction rate: | | |
| 1 | 13.312 | 7.512 | +/−0.809 | 2.793 | 10.753 |
| 2 | 11.574 | 2.678 | +/−2.792 | 0.164 | 6.410 |
| 3 | 11.616 | 8.609 | +/−17.273 | 2.977 | 24.679 |
| aggregate: | | 18.799 | | 0.164 | 24.679 |

| Pair | Measured Time (sec) | Average (sec) | 95% Conf. Interval | Minimum (sec) | Maximum (sec) |
|---|---|---|---|---|---|
| | | | Response time: | | |
| 1 | 13.312 | 0.13312 | +/−0.01434 | 0.09300 | 0.35800 |
| 2 | 11.574 | 0.37335 | +/−0.38921 | 0.15600 | 6.09100 |
| 3 | 11.616 | 0.11616 | +/−0.23307 | 0.04052 | 0.33588 |
| aggregate: | | 0.20754 | | 0.04052 | 6.09100 |

In the example of TABLE 6, throughput calculations are shown in kilobytes (KB) per second. This is calculated as ((Bytes_Sent+Bytes_Received)/1024)/Measured_Time. The calculations are also shown in megabits per second. Note that the kilobytes per second uses a divisor of 1024 while megabits per second uses a divisor of 1,000,000. The calculations for transaction rate are shown in transactions per second. This is calculated as Transaction_Count/Measured_Time. Response time is the inverse of transaction rate. The calculations are shown in seconds per transaction, which is calculated as Measured_Time/Transaction_Count. Within each of the calculations, the measured time column refers to the total of the measured time for all timing records produced by the corresponding row endpoint pair 22, 24. The Average, 95% Confidence Interval, Minimum, and Maximum columns have their ordinary statistical meaning. The aggregate row summarizes the results for each column.

The operations of the present invention have been generally described in connection with the Figures for tests where no errors are encountered. Error handling is preferably coordinated by console node 20 which is the point where user information is provided. There are many operations initiated by user input, such as running a scenario. The operation is handed to console engine 30 to complete, which notifies console graphic user interface 28 of the operation's success or failure at a later time. If a failure of any type occurs, the console engine 30 signals console graphic user interface 28 of the error, returning the failure return code and the handle to the basic message text associated with that return code. The console engine 30 also returns the handle of the appropriate object, so console graphic user interface 28 can obtain additional information. For example, if endpoint pair 22,24 could not be started, the console engine 30 returns the handle of the endpoint pair 22,24 that failed, along with the return code and its handle. Console graphic user interface 28 displays and logs the error; if the user requests additional help text for the error, console graphic user interface 28 requests the advanced message text from console engine 30. Console graphic user interface 28 then displays the advanced text.

Detailed Program Flow Examples

Examples of detailed program flow and "pseudo-code" will now be provided for the various program flows in practicing an embodiment of the present invention. Console node 20 has the following exchange with each endpoint node 14, 15, 16, 17, 18 in a scenario during setup:

```
Presetup Flow:
Console              Endpoint 1      Endpoint 2
    to E1 Master
    --------------->
    "Presetup E1" Command
    Version Numbers
    Verification ID
    Copyright Info
    Test Flag
    Requirements list
    E2 contact info
        protocol
        service quality
        network name
        program name of E2 Master
            MASTER:
            Accepts connection
            Receives data
            Validates info
            - fail, if invalid
            Sends info to E2
                to E2 Master
                --------------->
                "Presetup E2" Command
                Version Numbers
                Verification ID
                Copyright Info
                Test Flag
                Requirements list
                    MASTER:
                    Accepts connection
                    Receives data
                    Validates info
                    - fail, if invalid
                    Starts Copy of E2 w/ correct parms
                    Tells E1 Ready
                <---------------
OK:
"Presetup Reply" Command
    Version Numbers
Program name of E2 script
    and Deallocate
NEGOTIATION FAILURE:
"Presetup Error" Command
Version Numbers
Error Location
Requirements list
```

```
                those features not supported
                and Deallocate
                OTHER FAILURE:
                    generic error flow
                    and Deallocate
        MASTER:
            E1 checks E2 info
            if OK, starts copy of E1
                with correct parms
            Reply to Console
    <---------------
    OK:
    "Presetup Reply" Command
    Version Numbers
    Program name of E2 script
    Program name of E1 script
    Program name of E1 stop
    E1 magic ID
    and Deallocate
    NEGOTIATION FAILURE:
    "Presetup Error" Command
    Version Numbers
    Error Location
    Requirements list
        those features not supported
    and Deallocate
    OTHER FAILURE:
        generic error flow
        and Deallocate
```

Console node 20 processes the responses it gets back from all endpoint 1 nodes 14, 15, 16, 17, 18. If all are OK, it issues the Setup flow. In the following, the "E2 Contact Info" is provided because the endpoint master 44 does not always start endpoint 1 node engine 46, 46' on all platforms.

```
Setup Flow:
Console              Endpoint 1        Endpoint 2
    to E1 Script
    --------------->
        "Setup E1" Command
        Verification ID
        Copyright Info
        E2 script code
        E1 script code
        Reporting Type
        E2 contact info
            protocol
            service quality
            network name
            program name of E2 Script
        E1:
            Accepts connection
            Receives data
            Sends info to E2
                to E2 Script
                --------------->
                    "Setup E2" Command
                    Verification ID
                    Copyright Info
                    E2 script code
                    E2:
                        Accepts connection
                        Receives data
                        Tells E1 Ready
                <---------------
        OK:
        "Reply Okay" Command
        and Deallocate
        ERROR:
            generic error flow
        E1 checks E2 info
        Issues nonblocking Accept
        Reply to Console
    <---------------
    OK:
```

```
        "Reply Okay" Command
        ERROR:
            generic error flow
```

If a failure code is returned, the fields contained in a generic error flow are added. The setup error flow occurs in conditions such as when endpoint 2 node 16, 17 cannot be reached, endpoint 1 node 14, 15 and endpoint 2 node 16, 17 cannot use the specified network protocol, or endpoint 1 node 14, 15 or endpoint 2 node 16, 17 detect a problem in the scripts sent to them.

From the perspective of console node 20 the setup flows are as follows:

```
SETUP FLOW
Do for each endpoint pair
    Allocate to Master
    Send (request to start)
Do for each endpoint pair
    Receive response (and Deallocate)
If (SUCCESS)
    Do for each endpoint pair
        Allocate to E1
        Send (scripts and stuff)
    Do for each endpoint pair
        Receive response
else
    Send special takedown in place of sending scripts
    Looks much like stop logic, but has to include connection info.
    GOTO END
if (SUCCESS)
    Do for each endpoint pair
        Send (Start command)
    Do for each endpoint pair
        Receive response
    Do for each endpoint pair
        Wait for results
else
    execute Stop logic
```

The start running flow with no errors is as follows:

```
Start Flow:
Console              Endpoint 1        Endpoint 2
    --------------->
        "Start" Command
        If ERROR:
            generic error flow
                E1 starts its script
                --------------->
                <---------------
```

If a stop is issued by console node 20 during setup the flow is as follows if no errors are encountered:

```
Console              Endpoint 1        Endpoint 2
    new conv. to E1 stop pgm
    --------------->
        "Stop Special" Command
        Verification ID
        Copyright Info
        E2 contact info
            protocol
            service quality
            network name
            program name of E2 Script
        E1:
            parses input
            Sends info to E2
```

```
                    ---------------->
                     "Stop Special" Command
                     Verification ID
                     Copyright Info
                    <----------------
                     OK:
                     "Reply Okay" Command
                     and Deallocate
                     Reply to Console
  <----------------
   "Reply Okay" Command
   and Deallocate
```

If a stop is issued by console node 20 during running of a test the flow is as follows if no errors are encountered:

```
Console              Endpoint 1        Endpoint 2
new Conv. to E1 stop pgm
---------------->
  "Stop" Command
       E1:
        parses input
        Sends info to E2
                 on Script Conversation
                 ---------------->
                      Deallocate
                           E2 stops
                      Reply to Console
  <----------------
  REPORT RECORD(S):
  "Report" Command
  Timing record
  ... repeated
  <----------------
  OK:
  "Reply Okay" Command
  and Deallocate
  ERROR:
  generic error flow
  and Deallocate
```

A report flow returning timing records when no errors are encountered is as follows:

```
Console              Endpoint 1        Endpoint 2
                     - when done
                     - when error
                     - at each checkpoint
                       (realtime) or when
                       full (batch)
  <----------------
  REPORT RECORD(S):
  "Report" Command
  Report ordinal -- by pair
  Console's Report ID
  Timing record
  ... repeated
```

Finally, an echo flow may be transmitted when console node 20 wants to confirm an endpoint node 14, 15, 16, 17, 18 if present and to determine roundtrip communication time. The echo flow is as follows:

```
Console              Endpoint 1        Endpoint 2
  ---------------->
  "Echo" Command
  <----------------
  OK:
  "Reply Okay" Command
```

```
  ERROR:
  generic error flow
```

In the drawings, specification and examples, there have been disclosed typical preferred embodiments of the invention and, although specific terms are employed, these terms are used in a generic and descriptive sense only and not for purposes of limitation, the scope of the invention being set forth in the following claims.

That which is claimed:

1. A method for testing the performance of a communications network including a plurality of endpoint nodes comprising the steps of:

adding a console node to the network;

defining a test scenario to simulate communications traffic between the endpoint nodes to be tested including selecting a plurality of endpoint nodes for the test scenario and defining endpoint information including an endpoint node specific test protocol for each of the selected endpoint nodes;

communicating the endpoint information over the network from the console node to the selected endpoint nodes;

initiating execution of the endpoint node specific test protocols on the selected endpoint nodes from the console node; and, monitoring the performance of the network while the endpoint node specific test protocols are executed to obtain performance data.

2. A method for testing performance of a communications network according to claim 1 wherein the network is a computer network and wherein the console node resides on a computer.

3. A method for testing performance of a communications network according to claim 2 wherein the console node is executed as an applications level program on a computer.

4. A method for testing performance of a communications network according to claim 2 wherein at least two of the plurality of endpoint nodes reside in a single computer.

5. A method for testing performance of a communications network according to claim 2 wherein said initiating step includes the step of synchronizing initiating the execution on the selected endpoint nodes of the endpoint node specific test protocols.

6. A method for testing performance of a communications network according to claim 2 wherein said step of defining a test scenario is preceded by the step of detecting the communications capabilities of at least one of the endpoint nodes from the console node.

7. A method for testing performance of a communications network according to claim 2 wherein said step of defining a test scenario is preceded by the step of detecting active protocol stacks on at least one of the endpoint nodes from the console node.

8. A method for testing performance of a communications network according to claim 2 wherein said monitoring step is followed by the step of terminating execution of all the endpoint node specific test protocols when one of the endpoint node specific test protocols completes execution.

9. A method for testing performance of a communications network according to claim 2 wherein said monitoring step is followed by the step of analyzing the monitored performance data to generate performance measurements selected from the group consisting of throughput, transaction rate and response time.

10. A method for testing performance of a communications network according to claim 9 wherein the generated performance measurements are selected from the group consisting of throughput and transaction rate.

11. A method for testing performance of a communications network according to claim 2 wherein the endpoint node specific test protocols include information selected from the group consisting of a type of data to transmit, how many times to transmit the data, what portion of the endpoint node specific test protocols to time during execution, and what acknowledgment to receive during execution of the endpoint node specific test protocols.

12. A method for testing performance of a communications network according to claim 11 wherein the endpoint information includes a network protocol.

13. A method for testing performance of a communications network according to claim 2 wherein a plurality of said endpoint node specific test protocols include a test protocol script selected from the group consisting of credit check, database update, file transfer, inquiry and packet transmit and wherein a plurality of different test protocol scripts are included in said test scenario.

14. A method for testing performance of a communications network including a plurality of endpoint nodes comprising the steps of:
   determining a type of application communication traffic expected on the communications network;
   adding a console node to the network;
   defining a test scenario to simulate the expected type of application communication traffic between the endpoint nodes to be tested including selecting a plurality of endpoint nodes for the test scenario and defining endpoint information including an endpoint node specific test protocol for each of the selected endpoint nodes;
   communicating the endpoint information over the network from the console node to the selected endpoint nodes;
   initiating execution of the endpoint node specific test protocols on the selected endpoint nodes from the console node;
   monitoring the performance of the network at at least one of the selected endpoint nodes while the endpoint node specific test protocols are executed;
   terminating execution of all the endpoint node specific test protocols when one of the endpoint node specific test protocols completes execution; and, then
   reporting the monitored performance data from said monitoring step to the console node.

15. A method for testing performance of a communications network according to claim 14 wherein said reporting step is followed by the step of removing invalid results from said reported monitored performance data.

16. A method for testing performance of a communications network according to claim 14 wherein said reporting step is followed by the step of analyzing the reported monitored performance data to generate performance measurements.

17. A communications network performance testing system for testing a communications network including a plurality of endpoint nodes and a console node comprising:
   means for defining a test scenario to simulate communications traffic between said endpoint nodes to be tested including selecting a plurality of said endpoint nodes for said test scenario and defining endpoint information including an endpoint node specific test protocol for each of said selected endpoint nodes;
   means operatively connected to said means for defining for communicating said endpoint information over said network from said console node to said selected endpoint nodes;
   means operatively connected to said network for initiating execution of said endpoint node specific test protocols on said selected endpoint nodes from said console node; and
   means operatively connected to said network for monitoring performance of said network while said endpoint node specific test protocols are executed to obtain performance data.

18. A communications network performance testing system according to claim 17 where in said network is a computer network and wherein said console node resides on a computer.

19. A communications network performance testing system according to claim 18 wherein said console node is executed as an applications level program on said computer.

20. A communications network performance testing system according to claim 18 wherein at least two of said plurality of endpoint nodes reside in a single computer.

21. A communications network performance testing system according to claim 18 wherein said means for initiating includes means for synchronizing initiating execution on said selected endpoint nodes of said endpoint node specific test protocols.

22. A communications network performance testing system according to claim 18 further including means operatively connected to said network for detecting a communications capability of at least one of said endpoint nodes.

23. A communications network performance testing system according to claim 18 further including means operatively connected to said network for detecting active protocol stacks on at least one of said endpoint nodes.

24. A communications network performance testing system according to claim 18 further comprising means for terminating execution of all of said endpoint node specific test protocols when one of said endpoint node specific test protocols completes execution.

25. A communications network performance testing system according to claim 18 wherein said means for monitoring includes means for receiving said performance data from at least one of said selected endpoint nodes at said console node.

26. A communications network performance testing system according to claim 25 further including means operatively associated with said means for monitoring for analyzing said received performance data to generate performance measurements selected from the group consisting of throughput, transaction rate and response time.

27. A communications network performance testing system according to claim 26 wherein said performance measurements are selected from the group consisting of throughput and transaction rate.

28. A communications network performance testing system according to claim 18 wherein said endpoint node specific test protocols include information selected from the group consisting of a type of data to transmit, how many times to transmit said data, what portion of said endpoint node specific test protocols to time during execution, and what acknowledgment to receive during execution of said endpoint node specific test protocols.

29. A communications network performance testing system according to claim 28 wherein said endpoint information includes a network protocol.

30. A communications network performance testing system according to claim 18 wherein a plurality of said endpoint node specific test protocols include a test protocol script selected from the group consisting of credit check, database update, file transfer, inquiry and packet transmit and wherein a plurality of different test protocol scripts are included in said test scenario.

31. A computer program product for testing performance of a communications network including a plurality of endpoint nodes and a console node, the computer program product comprising:

a computer-readable storage medium having computer-readable program code means embodied in said medium, said computer-readable program code means comprising:

computer-readable program code means for defining a test scenario to simulate communications traffic between said endpoint nodes to be tested including selecting a plurality of endpoint nodes for said test scenario and defining endpoint information including an endpoint node specific test protocol for each of said selected endpoint nodes;

computer-readable code means operatively connected to said computer-readable code means for defining for communicating said endpoint information over said network from said console node to said selected endpoint nodes;

computer-readable code means operatively connected to said network for initiating execution of said endpoint node specific test protocols on said selected endpoint nodes from said console node; and computer-readable code means operatively connected to said network for monitoring performance of said network while said endpoint node specific test protocols are executed to obtain performance data.

32. A computer program product according to claim 31 wherein said computer-readable code means for initiating includes computer-readable code means for synchronizing initiating the execution on said selected endpoint nodes of said endpoint node specific test protocols.

33. A computer program product according to claim 31 further including computer-readable code means for detecting a communications capability of at least one of said endpoint nodes over said network.

34. A computer program product according to claim 31 further including computer-readable code means for detecting active communication stacks on at least one of said endpoint nodes over said network.

35. A computer program product according to claim 31 further comprising computer-readable code means for terminating execution of all of said endpoint node specific test protocols when one of said endpoint node specific test protocols completes execution.

36. A computer program product according to claim 31 wherein said computer-readable code means for monitoring includes computer-readable code means for receiving said performance data from at least one of said selected endpoint nodes at said console node.

37. A computer program product according to claim 36 further including computer-readable code means operatively associated with said computer-readable code means for monitoring for analyzing said received performance data to generate performance measurements selected from the group consisting of throughput, transaction rate and response time.

38. A computer program product according to claim 37 wherein said performance measurements are selected from the group consisting of throughput and transaction rate.

39. A computer program product according to claim 31 wherein said endpoint node specific test protocols include information selected from the group consisting of a type of data to transmit, how many times to transmit said data, what portion of said endpoint node specific test protocols to time during execution, and what acknowledgment to receive during execution of said endpoint node specific test protocols.

40. A computer program product according to claim 39 wherein said endpoint information includes a network protocol.

41. A computer program product according to claim 31 wherein a plurality of said endpoint node specific test protocols include a test protocol script selected from the group consisting of credit check, database update, file transfer, inquiry and packet transmit and wherein a plurality of different test protocol scripts are included in said test scenario.

* * * * *